United States Patent
Yamada et al.

(10) Patent No.: US 8,100,765 B2
(45) Date of Patent: Jan. 24, 2012

(54) STORAGE MEDIUM HAVING GAME PROGRAM AND GAME APPARATUS

(75) Inventors: Yoichi Yamada, Kyoto (JP); Yoshiyuki Oyama, Kyoto (JP); Keisuke Nishimori, Kyoto (JP); Kazuaki Morita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1093 days.

(21) Appl. No.: 11/481,881

(22) Filed: Jul. 7, 2006

(65) Prior Publication Data

US 2007/0060234 A1 Mar. 15, 2007

(30) Foreign Application Priority Data

Aug. 23, 2005 (JP) ................................. 2005-241159

(51) Int. Cl.
*G06F 17/00* (2006.01)
*G06F 19/00* (2011.01)
(52) U.S. Cl. ................ 463/31; 463/30; 463/42
(58) Field of Classification Search .............. 463/30–33, 463/40–42
See application file for complete search history.

(56) References Cited

U.S. PATENT DOCUMENTS

| | | | |
|---|---|---|---|
| 6,217,446 B1 * | 4/2001 | Sanbongi et al. ................ 463/7 |
| 6,267,674 B1 * | 7/2001 | Kondo et al. .................... 463/32 |
| 6,273,814 B1 * | 8/2001 | Komoto ........................... 463/7 |
| 6,409,604 B1 * | 6/2002 | Matsuno ........................ 463/43 |
| 6,881,149 B2 * | 4/2005 | Hasebe et al. ................. 463/43 |
| 7,033,275 B1 * | 4/2006 | Endo et al. ..................... 463/33 |
| 2001/0016511 A1 * | 8/2001 | Hino et al. ..................... 463/8 |
| 2001/0027129 A1 * | 10/2001 | Harima .......................... 463/32 |
| 2002/0165027 A1 * | 11/2002 | Kaminagayoshi .............. 463/43 |
| 2003/0038428 A1 | 2/2003 | Yotoriyama |
| 2005/0159223 A1 * | 7/2005 | Tahara et al. ................... 463/43 |
| 2005/0176503 A1 * | 8/2005 | Sakamoto et al. ............. 463/31 |
| 2006/0258450 A1 * | 11/2006 | Ishihata et al. ................. 463/31 |
| 2007/0173333 A1 * | 7/2007 | Matsuhara et al. ............ 463/43 |

FOREIGN PATENT DOCUMENTS

| | | |
|---|---|---|
| EP | 1254687 | 11/2002 |
| JP | 2004-000354 A | 1/2004 |

OTHER PUBLICATIONS

Mortal Kombat: Deadly Alliance for XBOX, Instruction Manual. Mortal Kombat: Deadly Alliance Released Nov. 22, 2002. Scanned Copy [online] [retrieved on Feb. 5, 2010]. Retrieved from ReplacementDocs <URL: http://www.replacementdocs.com/>.*
IGN.com: Mortal Kombat Review. Dated Nov. 19, 2002. [online] [retrieved on Feb. 5, 2010]. Retrieved from IGN.com <URL: http://xbox.ign.com/articles/377/377894p1.html>.* Killer Instinct Gold for N64, Instruction Manual. Killer Instinct Gold released Nov. 25, 1996. Scanned Copy. Copyright 1994-1996.*
"Killer Instinct 2". From Wikipedia, the free encyclopedia. [online] [ retrieved Dec. 8, 2010]. <URL: http://en.wikipedia.org/wiki/Killer_Instinct_2>.*
YouTube—Killer Instinct Gold TJCombo—75 Ultra Combo. YouTube Video. [online] [retrieved Dec. 8, 2010]. <URL: http://www.youtube.com/watch?v=1Hi4kdDa4E4>.*

* cited by examiner

*Primary Examiner* — Milap Shah
(74) *Attorney, Agent, or Firm* — Nixon & Vanderhye P.C.

(57) ABSTRACT

In an attack operation receiving step, an input of an operation for attacking an enemy object is received. In a determination step, when the input of the operation for attacking is received, it is determined whether or not a body strength value of the enemy object is within a predetermined range. When it is determined that the body strength value of the enemy object is within the predetermined range, a setting step of setting the enemy object to substantially the same state as where the body strength value of the enemy object is zero, regardless of the degree of damage caused by the attack motion, is executed.

12 Claims, 19 Drawing Sheets

F I G. 1 0
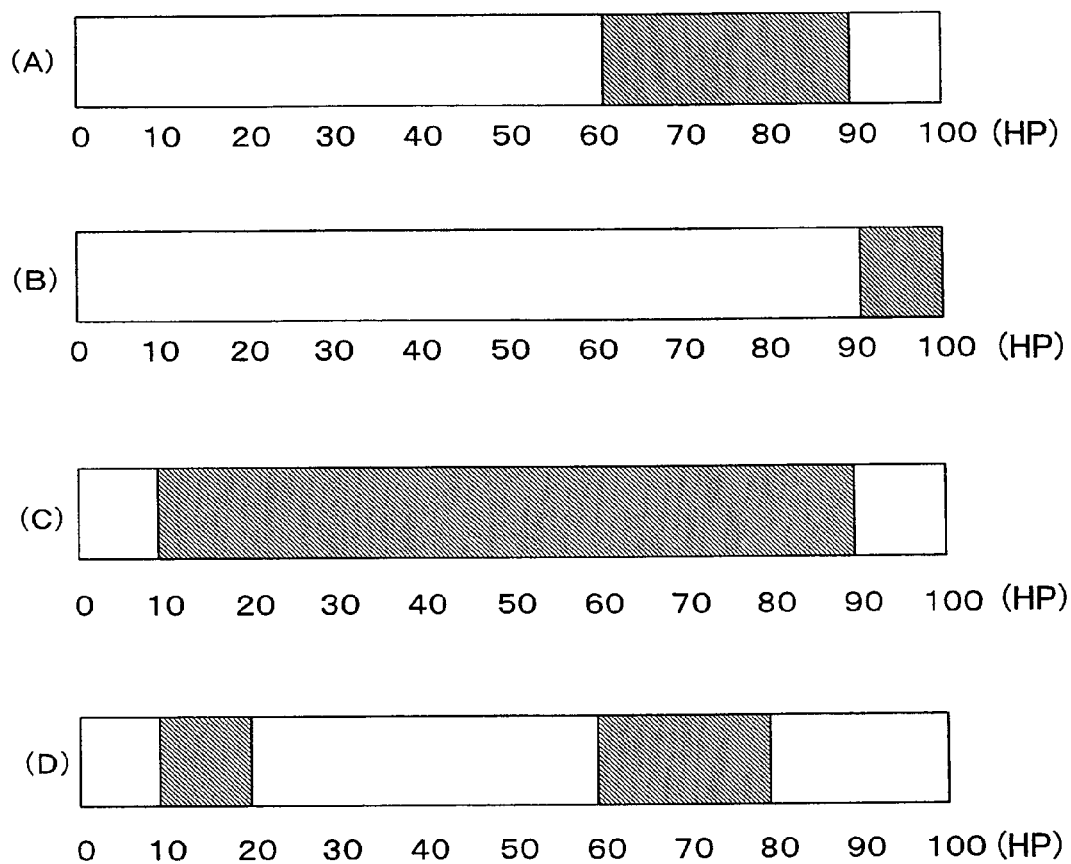

F I G. 1 1
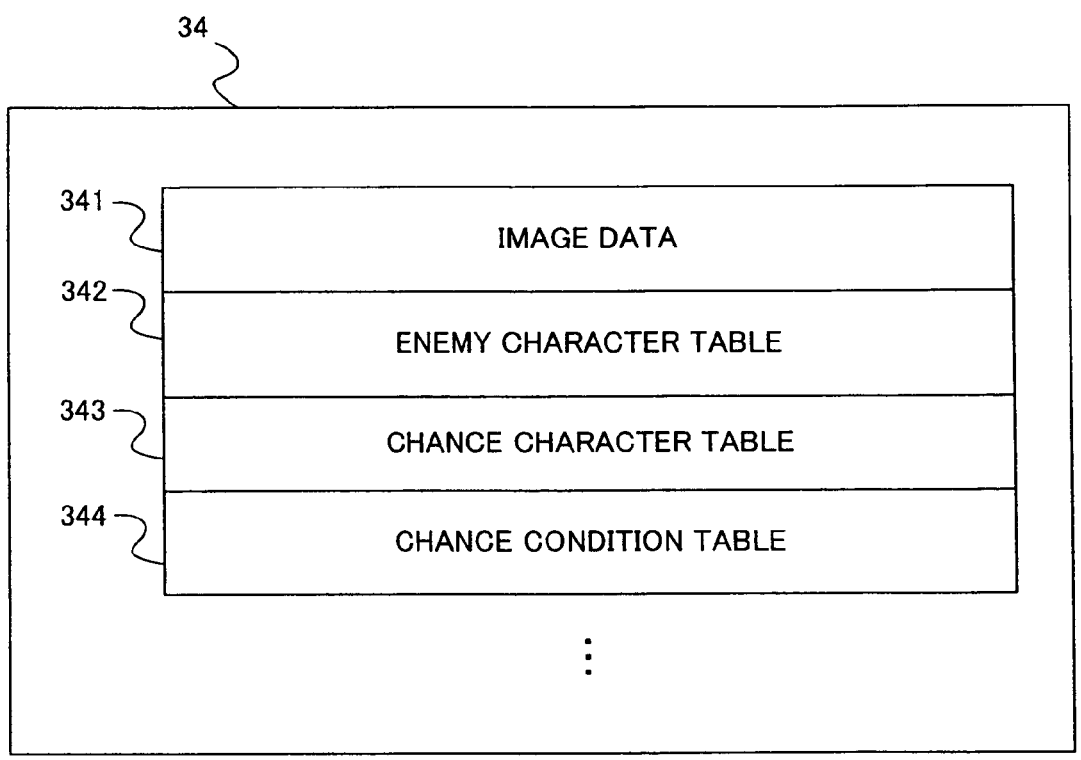

F I G. 1 2

| OBJECT ID | CURRENT HP | MAXIMUM HP | CHANCE CONDITION | CHANCE DURATION COUNT | TIME-UP FLAG |
|---|---|---|---|---|---|
| A-1 | 100 | 100 | 1 | 10 | ON |
| A-2 | 100 | 100 | 1 | 10 | ON |
| A-3 | 100 | 100 | 1 | 10 | OFF |
| B-1 | 120 | 120 | 2 | 15 | OFF |
| B-2 | 120 | 120 | 2 | 15 | OFF |
| C-1 | 120 | 120 | 1&2 | 5 | OFF |
| ⋮ | ⋮ | ⋮ | ⋮ | ⋮ | ⋮ |

| OBJECT ID | REMAINING CHANCE COUNT |
|---|---|
| A-3 | 10 |
| B-2 | 15 |
| B-3 | 23 |
| C-2 | 50 |
| ⋮ | ⋮ |

| CONDITION NUMBER | CONDITION |
|---|---|
| 1 | WHILE THE HP IS 60 TO 51. |
| 2 | WHILE THE HP IS 90 TO 81. |
| 3 | WHILE THE HP IS 70 TO 11. |
| 4 | WHILE THE SUN SHINES. |
| ⋮ | ⋮ |

STORAGE MEDIUM HAVING GAME PROGRAM AND GAME APPARATUS

CROSS REFERENCE TO RELATED APPLICATION

The disclosure of Japanese Patent Application No. 2005-241159 is incorporated herein by reference.

TECHNICAL FIELD

The exemplary embodiments disclosed herein relate to a storage medium having a game program stored thereon and a game apparatus, and in particular to a storage medium having a game program stored thereon and a game apparatus for an action game in which a player character defeats an enemy character.

BACKGROUND AND SUMMARY

Recently, as computers included in game systems provide increasingly higher performance, more and more three-dimensional games using the three-dimensional computer graphics technology are available. In a three-dimensional game, polygonal objects such as a player object, a topographic object and the like are located in a three-dimensional game space, and the game space seen from a predetermined viewpoint is displayed as a three-dimensional game image.

In some fight games or action games in which a player character operated by a player fights against an enemy character, a regular attack which can be made by an easy input operation is combined with a special attack made possible by a complicated input operation to damage the enemy character. A regular attack is different from a special attack in the difficulty level and the degree of damage caused to the enemy character. Therefore, in such a game, the player can fight against the enemy character while freely considering how to combine regular attacks and special attacks in order to defeat the enemy character (see, for example, Japanese Laid-Open Patent Publication No. 2004-354).

With the game apparatus disclosed by Japanese Laid-Open Patent Publication No. 2004-354, once the power gauge reaches a predetermined level, the player character can launch a special attack (finishing attack) accompanying a flashy visual effect or the like. When the power gauge is filled, it is notified of the player through the display that a special attack can be launched. Together with this notice, an operation procedure for generating a special attack is displayed. In general fight games or action games in which a player character operated by the game player fights against an enemy character, the degree of damage caused to the enemy character depends on the attack value of the attack performed by the player character. The degree of damage, which is calculated based on the attack value, is subtracted from the body strength value of the enemy character. Based on the result, it is determined whether or not the body strength value has become zero. Thus, it is determined whether or not the enemy character is defeated. When the enemy character is defeated, corresponding processing is executed.

However, with the game apparatus disclosed in Japanese Laid-Open Patent Publication No. 2004-354, even if the player character successfully launches a special attack, the special attack does not necessarily defeat the enemy character. In more detail, even if the player of the game works hard on a complicated input operation with a hope to obtain a sense of achievement about defeating the enemy with a special attack and successfully performs the special attack, it may turn out that the degree of damage corresponding to the special attack is a little short to decrease the body strength value of the enemy character to zero after the degree of damage is subtracted from the body strength value of the enemy character. It often happens that the enemy is finally defeated by a mediocre, regular attack made by simply, for example, hitting a button repeatedly. In such a case, the player cannot obtain a sense of achievement even if he/she succeeds in making a special attack through the complicated input operation. In action games in which numerous enemy characters appear in the same screen at the same time, each enemy character may make various different attacks (for example, a turtle-looking enemy character may hide itself in its mail or lie down with its belly up). However, the player character does not have many operation patterns to make against the enemy character. Therefore, the player character cannot attack different enemy characters in different patterns, and ends up in performing similar attacks in repetition. As a result, the game becomes boring.

Therefore, a feature of certain exemplary embodiments is to provide a storage medium having a game program stored thereon for an action game which sets a condition for defeating an enemy character with one blow without fail and allows the player to enjoy various strategies.

Certain exemplary embodiments have the following aspects to attain the feature mentioned above. The reference numerals, additional explanations and the like in parentheses in this section of the specification indicate the correspondence with the exemplary embodiment described later for easier understanding and do not limit the certain exemplary embodiments disclosed herein in any way.

A first aspect certain exemplary embodiments is directed to a storage medium having stored thereon a game program executable by a computer (CPU 22, etc.) of a game apparatus for displaying a player object (100) performing an attack motion in response to an operation by a player and at least one enemy object (101) associated with a body strength value which changes in accordance with a state in a virtual game world and for representing a fight between the objects in the virtual game world by which the body strength value of the enemy object is decreased in accordance with a degree of damage caused to the enemy object by the attack motion of the player object. The game program causes the computer to execute an attack operation receiving step (S4), a determination step (S2 and S6), and a setting step (S62). The attack operation receiving step receives an input of an operation for attacking the enemy object. The determination step, when the input of the operation for attacking is received, determines whether or not the body strength value of the enemy object is within a predetermined range. The setting step (S62), only when the determination step determines that the body strength value of the enemy object is within the predetermined range, sets the enemy object to substantially the same state as where the body strength value of the enemy object is zero, regardless of the degree of damage caused by the attack motion. The body strength value is a quantitative basis for determining whether or not an enemy character can act autonomously. In other words, the body strength value is a numerical value for determining, for example, what degree of injury the enemy character can withstand when attacked by the player character or other characters, or what degree of damage is necessary for the enemy character to die. The body strength value is generally referred to as a "hit point (HP)", a life point or the like.

According to a second aspect of the certain exemplary embodiments, only when the determination step determines that the body strength value of the enemy object is within the predetermined range, the setting step may set the body strength value of the enemy object to zero regardless of the degree of damage caused by the attack motion.

According to a third aspect of certain exemplary embodiments, the game program may further cause the computer to execute a first subtraction step (S43, S46) of, when the determination step determines that the body strength value of the enemy object is not within the predetermined range, decreasing the body strength value of the enemy object in accordance with the degree of damage caused by the attack motion.

According to a fourth aspect of certain exemplary embodiments, the game program may further cause the computer to execute a special attack receiving step (S41) and a second subtraction step (S43). The special attack receiving step receives an input of an operation for performing a special attack against the enemy object. The second subtraction step, when the input of the operation for performing the special attack is received, changes the body strength value of the enemy object such that the body strength value is included in the predetermined range.

According to a fifth aspect of certain exemplary embodiments, a range which is set for each of the at least one enemy object may be used for the predetermined range of the body strength value used for the determination in the determination step.

According to a sixth aspect of certain exemplary embodiments, at least two predetermined ranges may be set for each of the at least one enemy object.

According to a seventh aspect of certain exemplary embodiments, the game program may further cause the computer to execute a time duration setting step (S1, S3) of setting a predetermined time duration in which the setting step is permitted to be executed after the determination step determines that the body strength value of the enemy object is within the predetermined range.

According to an eighth aspect of certain exemplary embodiments, the at least one enemy object includes a plurality of enemy objects, and the time limit setting step may include a multiple time durations setting step (S1, S3) of setting a different predetermined time duration for each of the plurality of enemy objects.

According to a ninth aspect of certain exemplary embodiments, the game program may further cause the computer to execute an executability display step (S7) of, when the determination step determines that the body strength value of the enemy object is within the predetermined range, displaying that the setting step is executable on a screen of the game apparatus.

A tenth aspect of certain exemplary embodiments is directed to a game apparatus (14) for displaying a player object (100) performing an attack motion in response to an operation by a player and at least one enemy object (101) associated with a body strength value which changes in accordance with a state in a virtual game world and for representing a fight between the objects in the virtual game world by which the body strength value of the enemy object is decreased in accordance with a degree of damage caused to the enemy object by the attack motion of the player object. The game apparatus comprises attack operation receiving means, determination means, and setting means. The attack operation receiving means receives an input of an operation for attacking the enemy object. The determination means, when the input of the operation for attacking is received, determines whether or not the body strength value of the enemy object is within a predetermined range. The setting means, only when the determination means determines that the body strength value of the enemy object is within the predetermined range, sets the enemy object to substantially the same state as where the body strength value of the enemy object is zero, regardless of the degree of damage caused by the attack motion.

According to the first aspect, when the body strength value of the enemy object is within a predetermined range, the player can put the enemy object into substantially the same state as where the body strength value of the enemy object is zero, regardless of the degree of damage caused by the attack motion. Therefore, instead of a monotonous pattern of merely performing the same type of attack repeatedly to defeat the enemy object, the player is provided with an alternative opportunity to put the enemy object into substantially the same state as where the body strength value of the enemy object is zero (i.e., an alternative opportunity to defeat the enemy object) with one blow if only a predetermined condition is fulfilled. This broadens the range of available attacks or strategies, and thus makes the game ever-exciting.

According to the second aspect, when the body strength value of the enemy object is within the predetermined range, the player is provided with an opportunity to decrease the body strength value of the enemy object to zero regardless of the degree of damage caused by the attack motion. This broadens the range of available attacks or strategies, instead of a monotonous attack pattern, and thus makes the game ever-exciting.

According to the third aspect, when the body strength value of the enemy object is not within the predetermined range, the player can only decrease the body strength value of the enemy object by the amount in accordance with the degree of damage. This increases the sense of achievement felt by the player when the player fulfills the predetermined condition and defeats the enemy object with one blow.

According to the fourth aspect, the player can perform an operation for a special attack of changing the body strength value of the enemy object such that the body strength value is included in the predetermined range. This allows the player to defeat the enemy object with the next attack operation, and gives the player a sense of achievement of defeating the enemy object by performing two attacks consecutively.

According to the fifth aspect, the range of body strength values in which the enemy object can be defeated with one blow is different regarding each enemy object. Therefore, the player is provided with the fun of seeking an opportunity to defeat each enemy object with one blow, which makes the game ever-exciting.

According to the sixth aspect, a plurality of ranges of body strength values in which the enemy object can be defeated with one blow are provided regarding each enemy object. Even if the player fails once in defeating the enemy object with one blow, the player can obtain another opportunity to defeat the enemy object with one blow. This broadens the range of available strategies and does not deprive the player of the sense of achievement.

According to the seventh aspect, the time duration in which the enemy object can be defeated with one blow is limited. Therefore, the player is provided with a sense of tension, which makes the game ever-exciting.

According to the eighth aspect, the limited time duration in which the enemy object can be defeated with one blow is different regarding each enemy object. This broadens the range of available strategies, and the player is provided with different degrees of tension regarding different enemy objects. This makes the game ever-exciting.

According to the ninth aspect, it is displayed on the screen that the setting step is executable. Therefore, the player can more easily recognize when he/she has an opportunity to defeat the enemy object with one blow. The player is less likely to miss the opportunity to defeat the enemy object with one blow and obtains a higher sense of achievement.

The game apparatus according to other exemplary embodiments provides substantially the same effects as those of the first aspect mentioned above.

These and other features, aspects and advantages of certain exemplary embodiments will become more apparent from the following detailed description when taken in conjunction with the accompanying drawings.

BRIEF DESCRIPTION OF THE DRAWINGS

FIG. 10 shows exemplary chance conditions against enemy characters;

FIG. 11 shows a memory map of a main memory;

FIG. 12 shows an exemplary enemy character table;

FIG. 13 shows an exemplary chance character table;

FIG. 14 shows an exemplary chance condition table;

DETAILED DESCRIPTIONS

Hereinafter, an exemplary embodiment will be described with reference to the drawings. This exemplary embodiment is not intended to be limiting.

Figure 1:
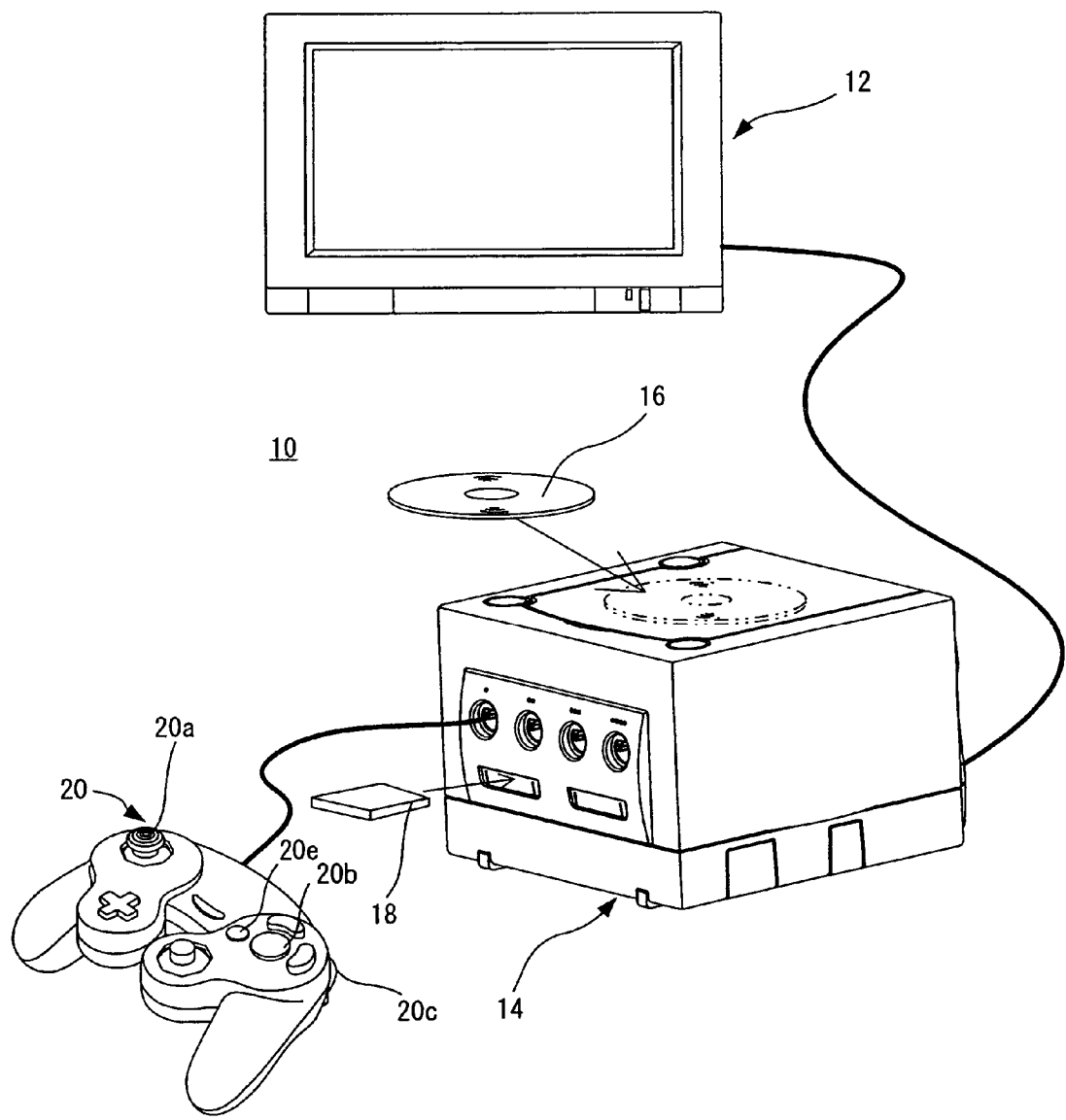
FIG. 1 is an external view showing a structure of a game system according to an exemplary embodiment.
Figure 2:
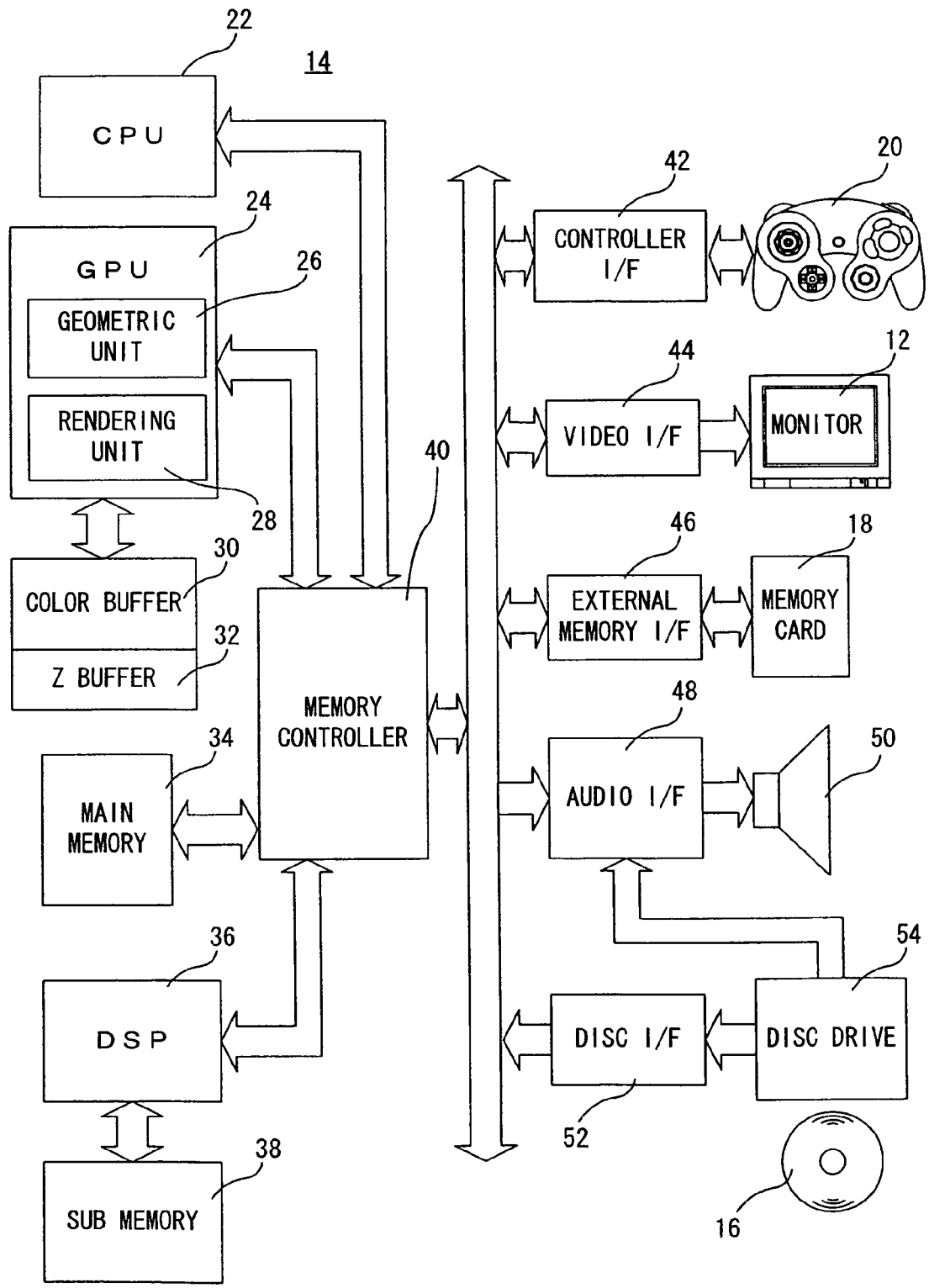
FIG. 2 is a block diagram of the game system shown in FIG. 1.

FIG. 1 is an external view showing a structure of a game system according to an exemplary embodiment, and FIG. 2 is a block diagram thereof. As shown in FIG. 1 and FIG. 2, the game system includes a game apparatus 14, an optical disc 16, a memory card 18, a controller 20, and a TV 12 (including a speaker 50 shown in FIG. 2). The optical disc 16 and the memory card 18 are detachably mountable on the game apparatus 14. The controller 20 is connected to either one of a plurality of (four in FIG. 1) connectors for controller ports in the game apparatus 14. The controller 20 includes a plurality of operation sections, and specifically includes a joystick 20a, an A button 20b, an R button 20c, a B button 20e, a Z button (not shown) and the like. In other exemplary embodiments, the game apparatus 14 and the controller may communicate each other wirelessly without using a communication cable. The TV 12 and the speaker 50 are connected to the game apparatus 14 via an AV cable or the like. The certain exemplary embodiments are not limited to an installation type game apparatus as shown in FIG. 1, and are applicable to a mobile game apparatus, an industrial game apparatus, or an apparatus capable of performing a game such as a cellular phone, a personal computer or the like, needless to say. Hereinafter, with reference to FIG. 2, each element of the game system according to the certain exemplary embodiments will be described in detail and a general operation of the game system will be described.

The optical disc 16 as an exemplary external storage medium is, for example, a DVD-ROM and fixedly stores a game program and data on a game such as character data and the like. Before a player plays the game, the optical disc 16 is mounted on the game apparatus 14. Means for storing the game program and the like is not limited to a DVD-ROM, and may be a storage medium such as a CD-ROM, an MO, a memory card, a ROM cartridge or the like. Alternatively, the game program and the like may be stored in storage means in the game apparatus 14 such as a memory, a hard disc or the like. In this case, a game program may be downloaded by communication. The memory card 18 is formed of a rewritable storage medium such as, for example, a flash memory, and stores data such as saved data and the like in the game.

The game apparatus 14 reads the game program stored on the optical disc 16 and performs game processing. The controller 20 is an input device for allowing the player to input data for the game operations. As described above, the controller 20 includes the joystick 20a and a plurality of operation switches. The controller 20 outputs operation data to the game apparatus 14 in accordance with, for example, the type of operation performed on the joystick 20a by the player or the operation switch pressed by the player. The TV 12 displays image data which is output from the game apparatus 14 on a screen thereof. The speaker 50 is typically built in the TV 12, and outputs audio data of the game which is output from the game apparatus 14. When a plurality of players play the game, a number of controllers 20 corresponding to the number of the players are provided.

Next, the structure of the game apparatus 14 will be described. As shown in FIG. 2, the game apparatus 14 includes a CPU 22 and a memory controller 40 connected to the CPU 22. In the game apparatus 14, the memory controller 40 is connected to a graphics processing unit (GPU) 24, a main memory 34, a digital signal processing circuit (DSP) 36, and various interfaces (I/F) 42 through 52. The memory controller 40 is also connected to a sub memory 38 via the DSP 36. The memory controller 40 controls data transfer between these elements in the game apparatus 14.

For starting the game, a disc drive 54 first drives the optical disc 16 mounted on the game apparatus 14. The game program stored on the optical disc 16 is read into the main memory 34 via a disc I/F 52 and the memory controller 40. The game is started by the CPU 22 executing the program on the main memory 34. After the game is started, the player inputs data on game operations to the controller 20 using the joystick 20a or the operation switches. In accordance with the inputs from the player, the controller 20 outputs the operation data to the game apparatus 14. The operation data which is output from the controller 20 is input to the CPU 22 via a controller I/F 42 and the memory controller 40. The CPU 22 performs game processing in accordance with the input operation data. For generating image data or the like in the game processing, the GPU 24 or the DSP 36 is used. The sub memory 38 is used by the DSP 36 for performing predetermined processing.

The GPU 24 includes a geometry unit 26 and a rendering unit 28, and is connected to a memory specialized for image processing. The memory specialized for image processing is used as, for example, a color buffer 30 or a Z buffer 32. The geometry unit 26 performs calculation processing on coordinate sets of a three-dimensional (3D) model (for example, an object formed of a polygon) regarding an object or graphics located in a game space, which is a virtual 3D space. For example, the geometry unit 26 rotates, enlarges or reduces, and deforms a 3D model, and converts the coordinate sets thereof of a world coordinate system into coordinate sets in a viewpoint coordinate system or a screen coordinate system. The rendering unit 28 writes color data (RGB data) of each pixel of a 3D model projected on the screen coordinate system into the color buffer 30 based on a predetermined texture, and thus generates a game image. The color buffer 30 is a memory area saved for maintaining game image data (RGB data) generated by the rendering unit 28. The Z buffer 32 is a memory area saved for, when a 3D viewpoint coordinate set is converted into a 2D screen coordinate set, maintaining depth information from the viewpoint. The GPU 24 generates image data to be displayed on the TV 12 using the geometry unit 26 and the rendering unit 28, and outputs the generated image data to the TV 12 via the memory controller 40 and a video I/F 44 when necessary. Audio data, which is generated by the CPU 22 when the game program is executed, is output to the speaker 50 via the memory controller 40 and an audio I/F 48. In this exemplary embodiment, the memory specialized for image processing is hardware which is separately provided. The exemplary embodiment is not limited to this, and a method of using a part of the main memory 34 as a memory for image processing (UMA: Unified Memory Architecture) may be used, for example. The game apparatus 14 transfers the game data generated by executing the game program to the memory card 18 via the memory controller 40 and a memory I/F 46. Before the game is started, the game apparatus 14 reads the game data stored on the memory card 18 into the main memory 34 via the memory controller 40 and the memory I/F 46.

Figure 3:
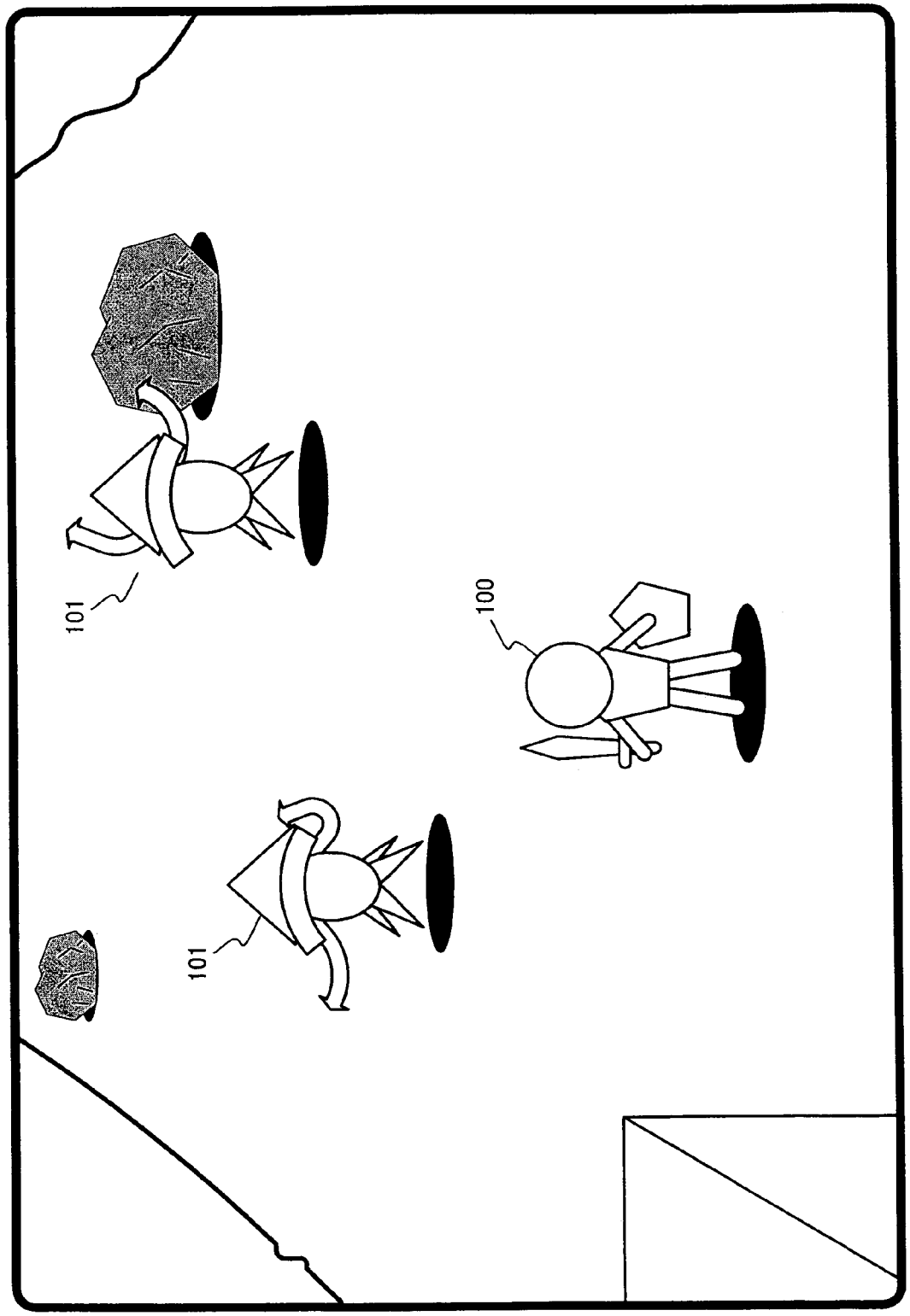
FIG. 3 shows an exemplary game image in an action game according to an exemplary embodiment.

Next, with reference to FIG. 3 through FIG. 14, an overview of the game in this exemplary embodiment will be described. The game in this exemplary embodiment is an action adventure game in which a player character goes through adventures in real time while fighting against an enemy in a virtual 3D game space. FIG. 3 shows an exemplary game image representing a virtual space in the action adventure game of this exemplary embodiment. As shown in FIG. 3, the virtual space contains a player character object 100 and enemy character objects 101, and is displayed on the TV 12 as a game image by a virtual camera taking an image of the player character object 100 and the enemy character objects 101. Hereinafter, the player character object will be referred to as a "player character", and each enemy character object will be referred to as an "enemy character".

The player of the game controls motions of the player character 100 by operating the controller 20. Specifically, the player moves the player character 100 in the virtual space by operating the joystick 20*a*, and causes the player character 100 to perform a first attack motion of slashing an enemy with a sword (hereinafter, referred to a "regular attack") by operating the B button 20*e*. The player character 100 approaches an enemy character 101 by such an operation by the player. If the attack by the player character 100 succeeds, a body strength value or a hit point (hereinafter, referred to as an "HP") of the enemy character 101 decreases. When the HP becomes zero, the enemy character 101 is regarded as being defeated.

In addition to the regular attack, the player character 100 can perform a second, special attack motion of, for example, performing "iaigiri" or quickly drawing the sword and slashing the enemy in one continuous motion (hereinafter, referred to as an "iaigiri attack"). In this exemplary embodiment, the player character 100 can be caused to perform an iaigiri attack by the player operating the B button 20*e* in the state where the enemy character 101 is present within a predetermined distance from the player character 100 and the sword of the player character 100 is kept in the sheath. The iaigiri attack damages the enemy character 101 more heavily than a regular attack. In this exemplary embodiment, it is assumed that a regular attack decreases the HP of the enemy character 101 by "10" (i.e., the regular attack has an attack power of "10"), and an iaigiri attack decreases the HP of the enemy character 101 by "40" (i.e., the iaigiri attack has an attack power of "40").

Figure 4:
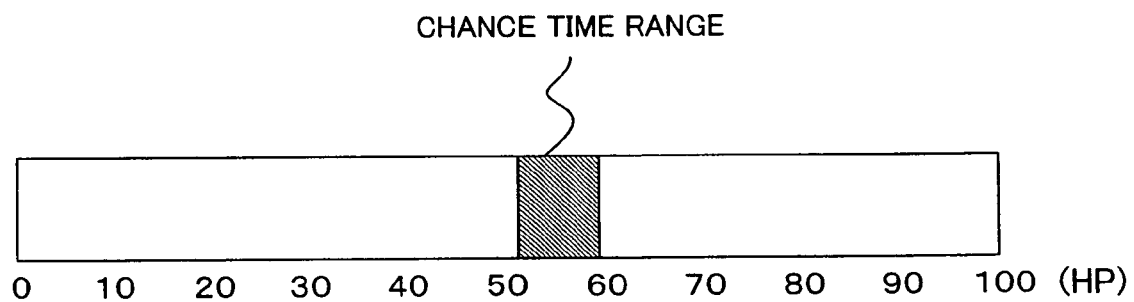
FIG. 4 shows an exemplary condition for activating a chance time based on an HP of an enemy character.
Figure 5:
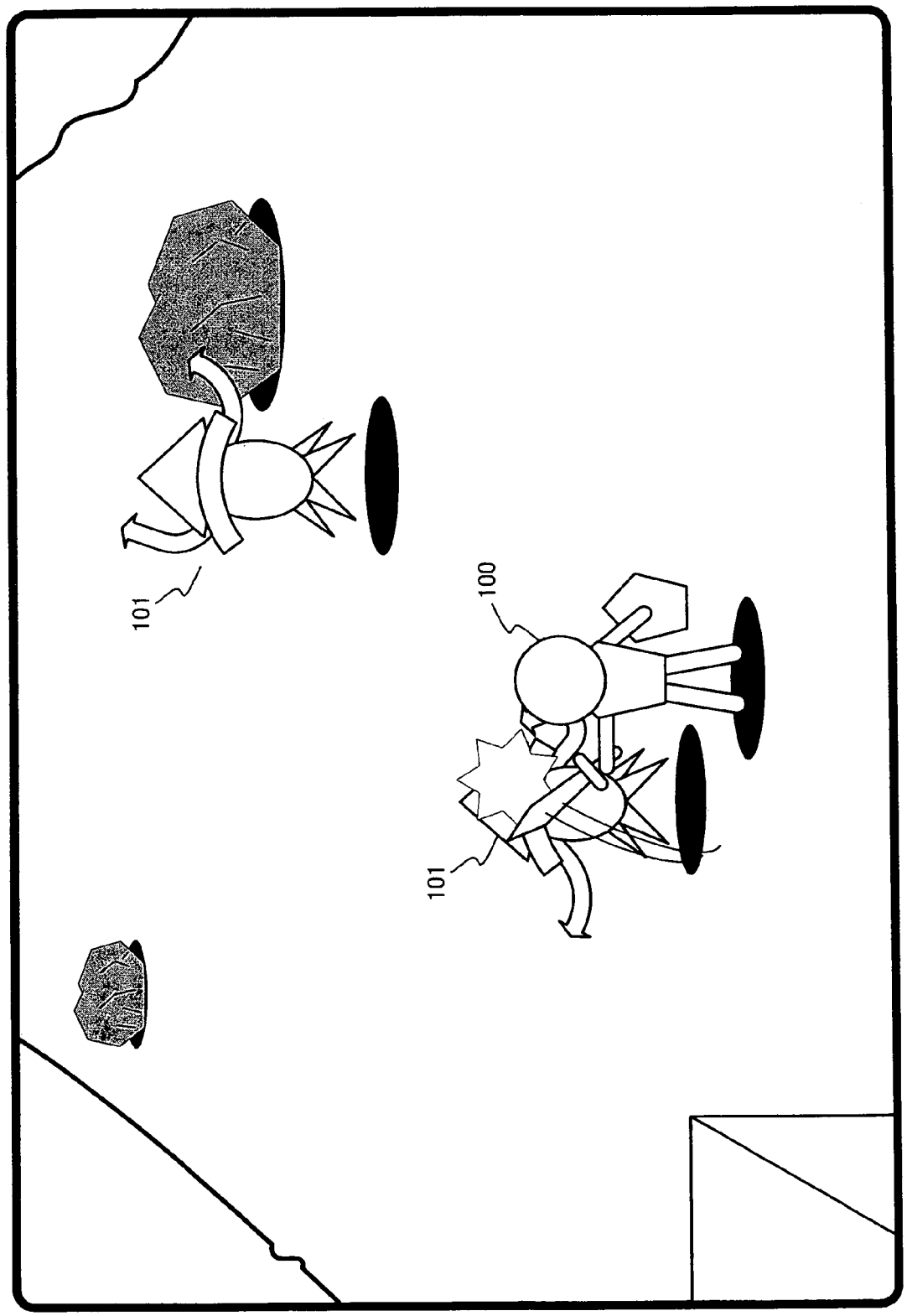
FIG. 5 shows an exemplary game image in which a player character 100 is performing a regular attack.
Figure 6:
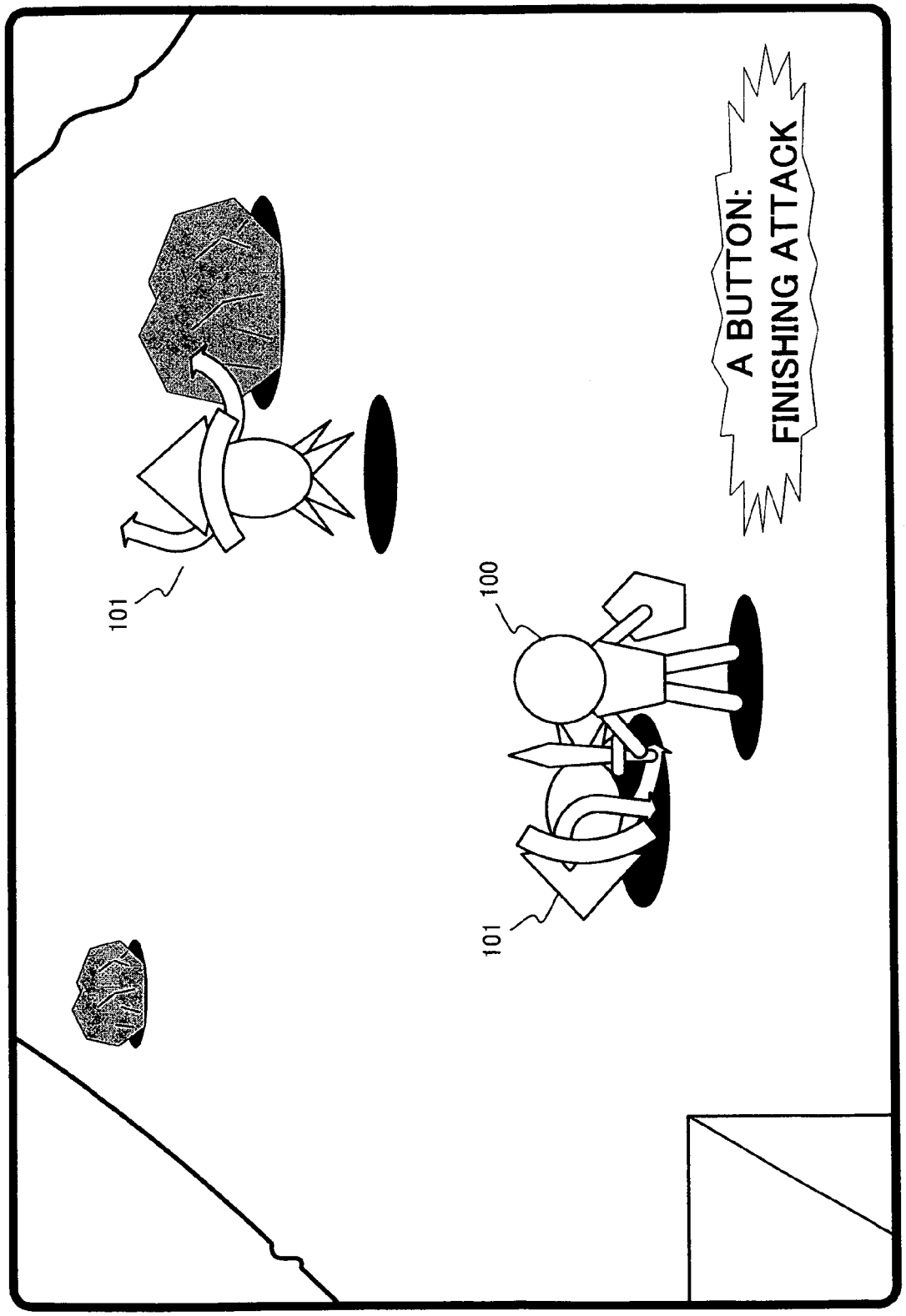
FIG. 6 shows an exemplary game image in which a finishing attack is executable.
Figure 7:
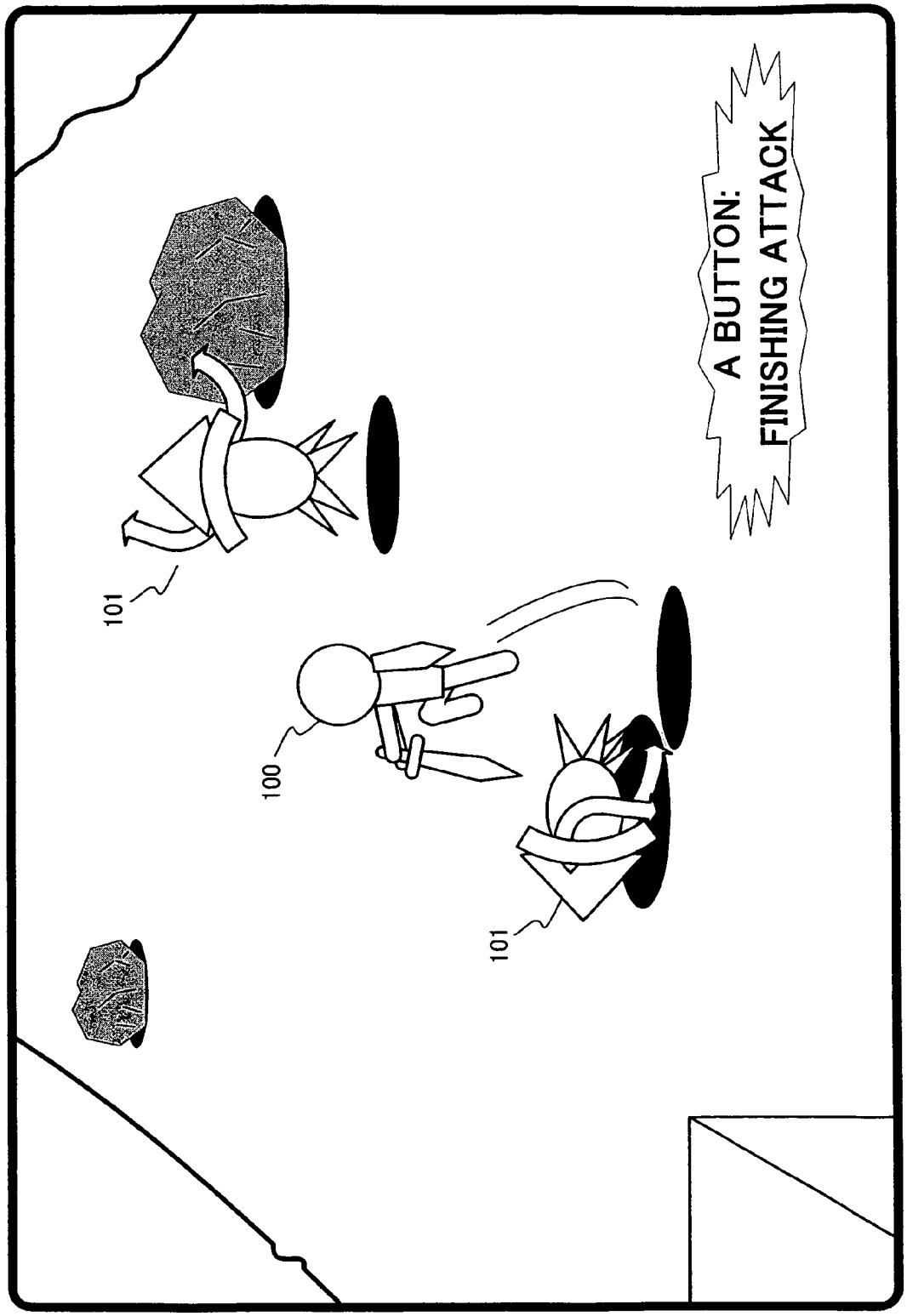
FIG. 7 shows an exemplary game image in which the player character 100 is performing the finishing attack.

The player character 100 can also be caused to perform a third attack motion (hereinafter, referred to as a "finishing attack") by the player operating the A button 20*b*. The "finishing attack" is executable only when a predetermined condition is fulfilled. When the finishing attack succeeds, the enemy character 101 is defeated right away, i.e., with one blow, regardless of the remaining HP value of the enemy character 101. A state in which the predetermined condition is fulfilled will be referred to as a "chance time". The player character 100 can perform a finishing attack only within a predetermined time duration after the "chance time" is activated. A different condition for activating the chance time is set regarding each enemy character 101. FIG. 4 shows an exemplary condition for activating a chance time. In this example, a remaining HP value is used as the condition. In the example of FIG. 4, the chance time is active against an enemy character 101 while the HP of the enemy character 101 is in the range of 51 to 60 with respect to the maximum HP value of 100. With reference to FIG. 5 through FIG. 7, a flow of attack in the game according to this exemplary embodiment in which such a chance time is set will be described.

FIG. 5 shows an exemplary game image in which the player character 100 is performing a regular attack. The HP of each enemy character 101 has an initial value of 100. Regarding each enemy character 101, a chance time as shown in FIG. 4 is set. Under such circumstances, the player controls the player character 100 holding a sword to approach the enemy character 101 sufficiently close to attack the enemy character 101, and then presses the B button 20*e*. Then, the player character 100 performs a regular attack. As described above, one regular attack can only give a damage of 10 to the enemy character 101. Therefore, in order to defeat the enemy character 101 with only the regular attack, the player character 100 needs to perform the regular attack at least 10 times.

FIG. 6 shows an exemplary game image while the chance time is active. In this exemplary embodiment, after a regular attack is performed on the enemy character 101 about four times, the HP of the enemy character 101 is decreased to 60. This fulfills the condition shown in FIG. 4 for activating the chance time, which allows the player character 100 to perform a finishing attack on the enemy character 101. At this point, a message indicating that a finishing attack is executable is displayed at the right bottom corner of the game image. In this exemplary embodiment, it is also indicated that a finishing attack is executable by displaying the enemy character 101 as lying down while the chance time is active.

FIG. 7 shows an exemplary game image in which the player character 100 is performing a finishing attack. By the player operating the A button 20*b* while the message indicating that the finishing attack is executable is displayed, i.e., while the chance time is active, the player character 100 performs the finishing attack. A finishing attack has a motion different from that of a regular attack or an iaigiri attack. In the example of FIG. 7, the finishing attack has a motion of the player character 100 jumping and piercing down the enemy character 101 with a sword.

Figure 8:
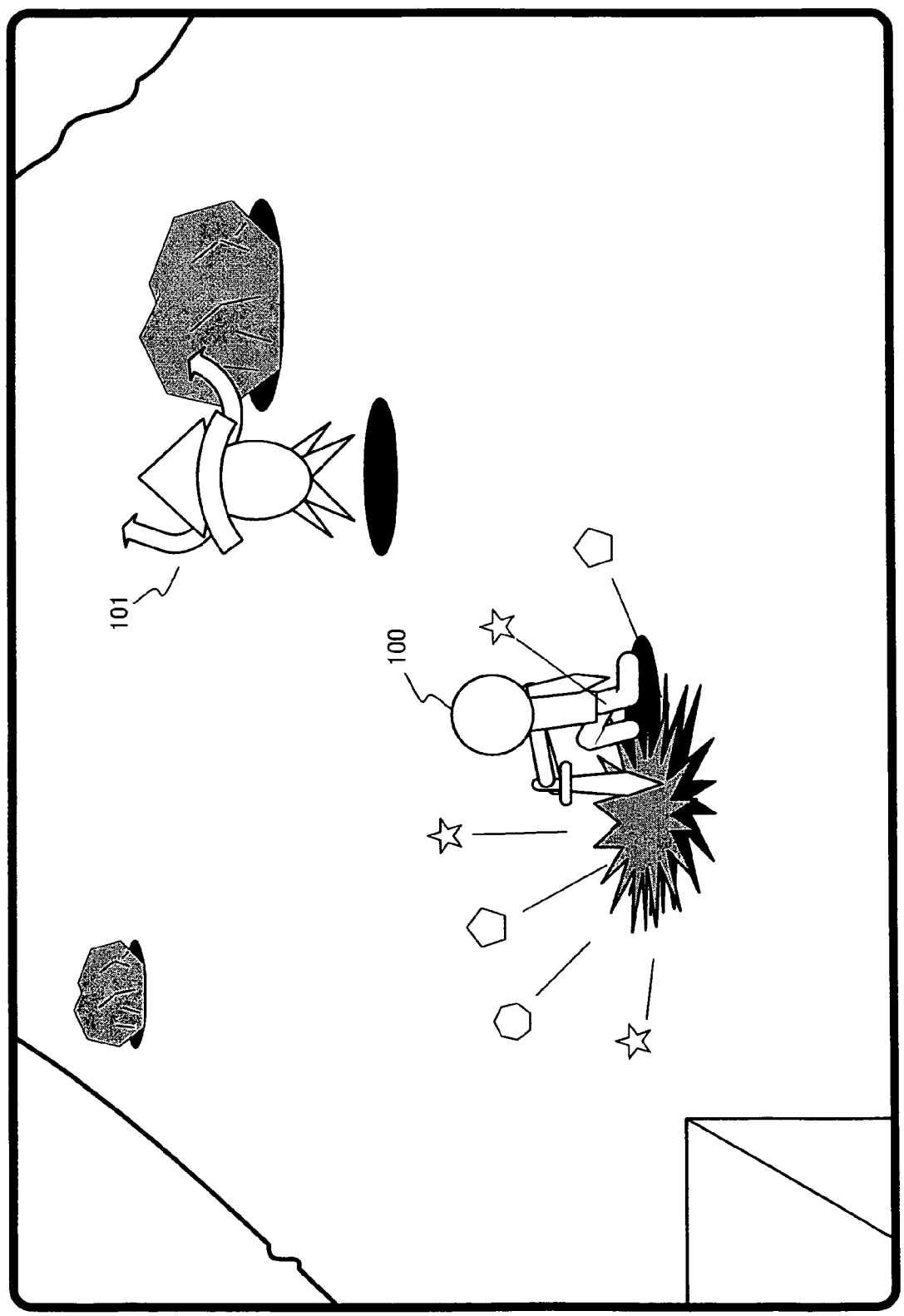
FIG. 8 shows an exemplary game image in which the player character 100 has defeated an enemy character.

FIG. 8 shows an exemplary game image in which the player character 100 has defeated the enemy character 101 by the finishing attack. Before the finishing attack, the HP of the enemy character 101 is 60. The player character 100 would have needed to perform a regular attack at least six more times in order to defeat the enemy character 101. Instead, the player character 100 defeated the enemy character 101 with one blow of the finishing attack regardless of the HP of the enemy character 101.

Figure 9:
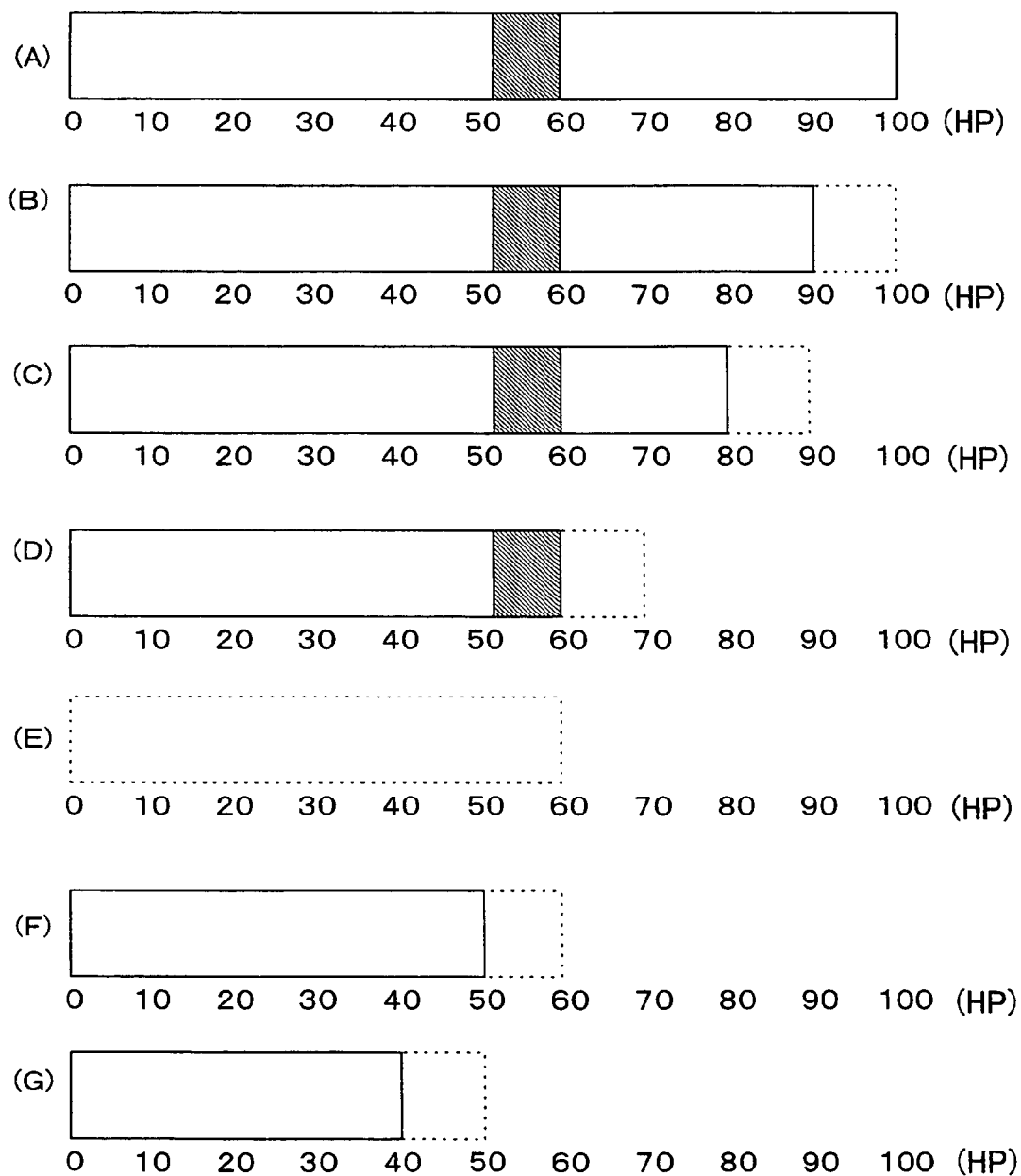
FIG. 9 shows how an HP of an enemy character is decreased.

By contrast, if the player character 100 performs a regular attack once while the chance time is active as shown in FIG. 6, the HP of the enemy character 101 becomes 50. This does not fulfill the condition for activating the chance time, and thus the player character 100 cannot perform a finishing attack. Namely, when the player character 100 successfully performs a regular attack four times (and thus decreases the HP of the enemy character to 60) and then performs a finishing attack, the enemy character 101 is defeated with one blow of the finishing attack. By contrast, when the player character 100 successfully performs a regular attack four times and then performs a regular attack one more time (and thus decreases the HP of the enemy character to 50), the player character 100 misses the opportunity to perform a finishing attack. The player character 100 needs to perform a regular attack or an iaigiri attack a plurality of times in order to defeat the enemy character 101. FIG. 9 shows how the HP is decreased by the above-described flow of the attack. In part (A), the HP of an enemy character is the maximum value of 100. When the player character performs a regular attack as shown in FIG. 5 in this state, the enemy character is given a damage of 10, resulting in having an HP of 90 as shown in part (B). When the player character performs a regular attack one more time, the enemy character is given a damage of 10, resulting in having an HP of 80 as shown in part (C). When the player character performs a regular attack two more times, the enemy character is given a damage of 20, resulting in having an HP of 60 as shown in part (D). At this point, a chance time is activated, and a message indicating that a finishing attack is executable is displayed as shown in FIG. 6. If the player presses the A button 20b to cause the player character to perform a finishing attack while the chance time is active, the HP of the enemy character becomes zero as shown in part (E) regardless of the remaining HP value at the stage of part (D). By contrast, if the player presses the B button 20e to cause the player character to perform a regular attack while the chance time is active, the enemy character is given a damage of 10, resulting in having an HP of 50 as shown in part (F). Consequently, the chance time is deactivated, and the message indicting that the finishing attack is executable is erased. Therefore, the player character needs to perform a regular attack several more times to decrease the HP by 10 each time in order to defeat the enemy character (part (G) of FIG. 9). As described above, in the game according to this exemplary embodiment, a predetermined range of HP values of an enemy character 101 is set as a chance time in which a finishing attack capable of defeating an enemy character with one blow regardless of the remaining HP value is executable. Thus, instead of a monotonous pattern of merely performing the same type of attack repeatedly to decrease the HP, the game provides the player with an alternative opportunity to defeat the enemy character, even with the same weapon, with one blow regardless of the remaining HP value if only a predetermined condition is fulfilled. This broadens the range of available strategies.

Different conditions for activating the chance time are set for different types or the like of the enemy characters 101. FIG. 10 shows exemplary conditions for activating the chance time, which are HP values in this example. Part (A) shows that the chance time is active against an enemy character while the HP of the enemy character is in the range of 61 to 90 with respect to the maximum HP value of 100. With such a condition, a finishing attack is made executable by performing a regular attack on the enemy character only once. Part (B) shows that the chance time is active against an enemy character while the HP of the enemy character is in the range of 91 to 100. With such a condition, a finishing attack is executable from the beginning, and the player character can defeat the enemy character with the first blow. However, if the player character fails in performing the finishing attack as the first blow, the player character needs to perform a regular attack or an iaigiri attack many times. Part (C) shows that the chance time is active against an enemy character while the HP of the enemy character is in the range of 11 to 90. With such a condition, the chance time is active inmost of the time, and it is very easy to defeat the enemy character with one blow. Part (D) shows that the chance time is active against an enemy character while the HP of the enemy character is in the range of 11 to 20 and in the range of 61 to 80. With such a condition, the player character is given two opportunities to defeat the enemy character. Even if the player character fails in performing a finishing attack during the first chance time, the player character can obtain another chance time after performing a regular attack in repetition. By setting various conditions for the chance time for different enemy characters, the range of available attacks or strategies can be broadened. For example, the player character can attempt to launch a finishing attack to defeat even a strong enemy, instead of repeating the monotonous pattern of merely performing the same type of attack to decrease the HP. In addition, the player can obtain a sense of achievement when defeating the enemy character with one successful blow of the finishing attack, and finds the game ever-exciting.

Next, the game processing executed by the game apparatus 14 will be described in detail. First, data stored on the main memory 34 for the game processing will be described. FIG. 11 shows a memory map of the main memory 34 of the game apparatus 14. For the game processing, the main memory 34 stores image data 341, an enemy character table 342, a chance character table 343, a chance condition table 344 and the like. The main memory 34 also stores data, such as the game program, read from the optical disc 16.

The image data 341 is data (polygon data, texture data, etc.) for generating a game image (the player character, the enemy characters, a background object, predetermined characters).

The enemy character table 342 shows enemy characters appearing in the field where the player character currently exists in a virtual game. As shown in FIG. 12, the enemy character table 342 is an assembly of sets of an object ID, a current HP, a maximum HP, a chance condition number, a chance duration count, and a time-up flag. The object ID is an ID for identifying the respective enemy character. The current HP represents the current HP of the respective enemy character, and the maximum HP represents an HP which is set as an initial value for the respective enemy character. When the enemy character is attacked by the player character, a value corresponding to the attack is subtracted from the current HP of the enemy character stored on the main memory 34 to update the current HP. When the current HP of the enemy character becomes zero, the enemy character is considered to be defeated. The chance condition number is associated with the chance condition table 344 described later, and represents a condition for activating a chance time. The chance duration count represents a time duration in which the chance time is continued. The chance duration count is set as an initial value of a remaining chance count included in the chance character table 343 described below, and the remaining chance count is counted down. The time-up flag indicates whether or not the remaining chance count becomes zero. The time-up flag is turned ON when the remaining chance count becomes zero after the chance time is activated. Each time the enemy character is attacked, the time-up flag is turned OFF.

The chance character table 343 shows enemy characters against which the chance time is active (hereinafter, such enemy characters will be referred to as "chance characters"). As shown in FIG. 13, the chance character table 343 is an assembly of sets of an object ID and a remaining chance count. The object ID is an ID for identifying each enemy character. When an enemy character is registered in the chance character table 343, the value of the chance duration count of the enemy character is set as the remaining chance count, and the remaining chance count is counted down. As the time passes, the remaining chance count is decreased. When the remaining chance count becomes zero, the chance time against the enemy character is over.

The chance condition table 344 defines conditions for activating a chance time. As shown in FIG. 14, the chance condition table 344 is an assembly of sets of a chance condition number and a condition. The chance condition number is a number for identifying each condition. As the condition, a condition for activating a chance time is defined.

The main memory 34 stores the state of the player character (HP of the player character, the weapon carried by the player character, etc.) in addition to the above-mentioned data. The main memory 34 also stores various data used for the game processing.

Figure 15:
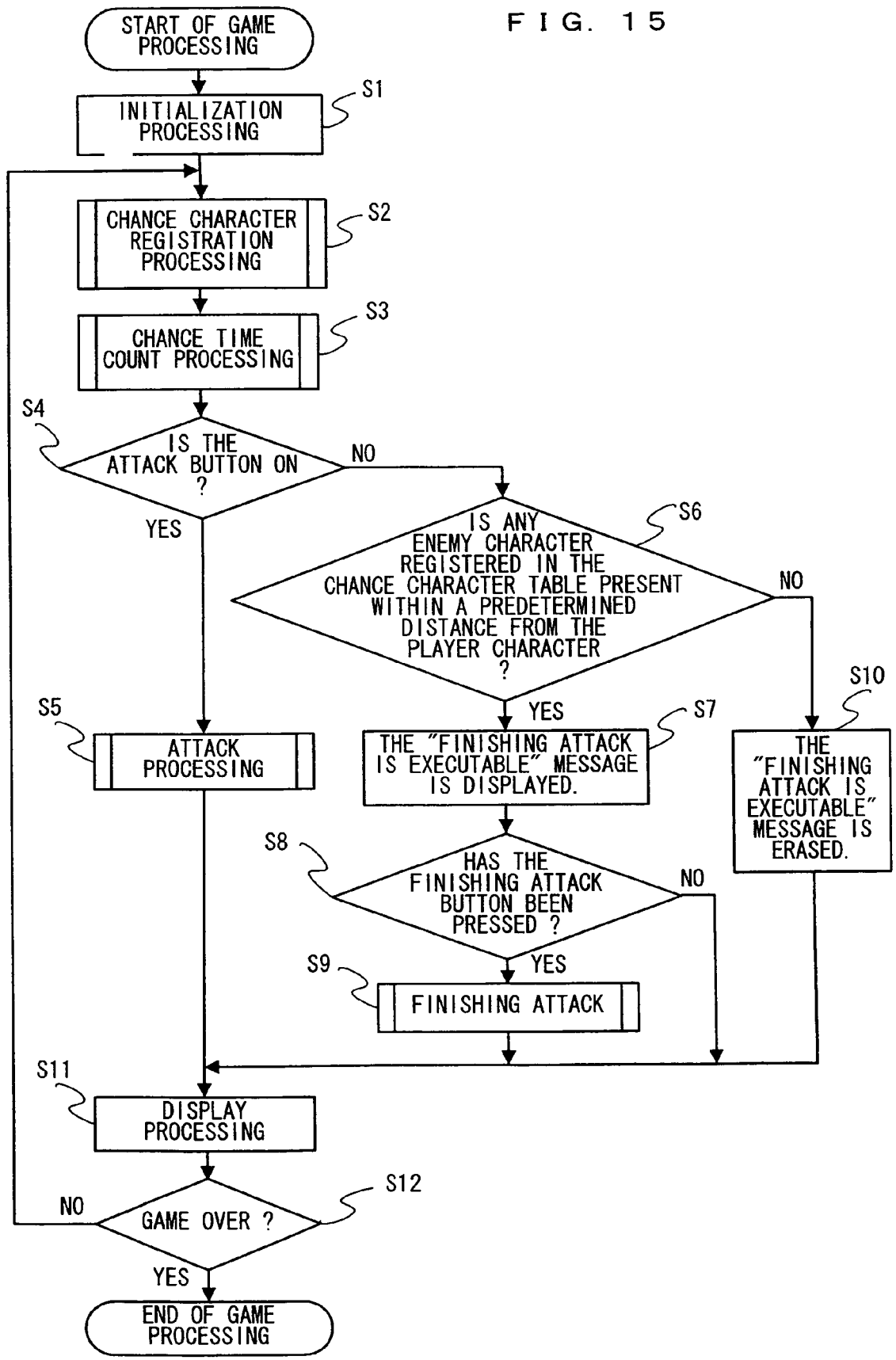
FIG. 15 is a flowchart of game processing.

With reference to FIG. 15 through FIG. 19, a flow of the game processing executed by the game apparatus 14 will be described. FIG. 15 is a flowchart illustrating a flow of the game processing executed by the game apparatus 14. When the game apparatus 14 is turned on, the CPU 22 of the game apparatus 14 executes a start program stored on a boot ROM (not shown) to initialize the elements including the main memory 34. The game program stored on the optical disc 16 is read into the main memory 34, and thus the execution of the game program is started. As a result, a game image is displayed on the TV 12 via the GPU 24. A part of the game processing other than the processing regarding attacks is not relevant to the exemplary embodiments described herein and will not be described in detail.

Referring to FIG. 15, in step S1, various data and the like are initialized; e.g., a chance condition (a condition for activating a chance time) and a chance duration count of each enemy character are set. Next, chance character registration processing of registering a chance character is executed (step S2). A "chance character" is an enemy character against which the chance time is active. In this processing, it is determined whether or not there is an enemy character fulfilling the corresponding chance condition. When there is such an enemy character, the enemy character is registered in the chance character table 343 and stored on the main memory 34.

Figure 16:
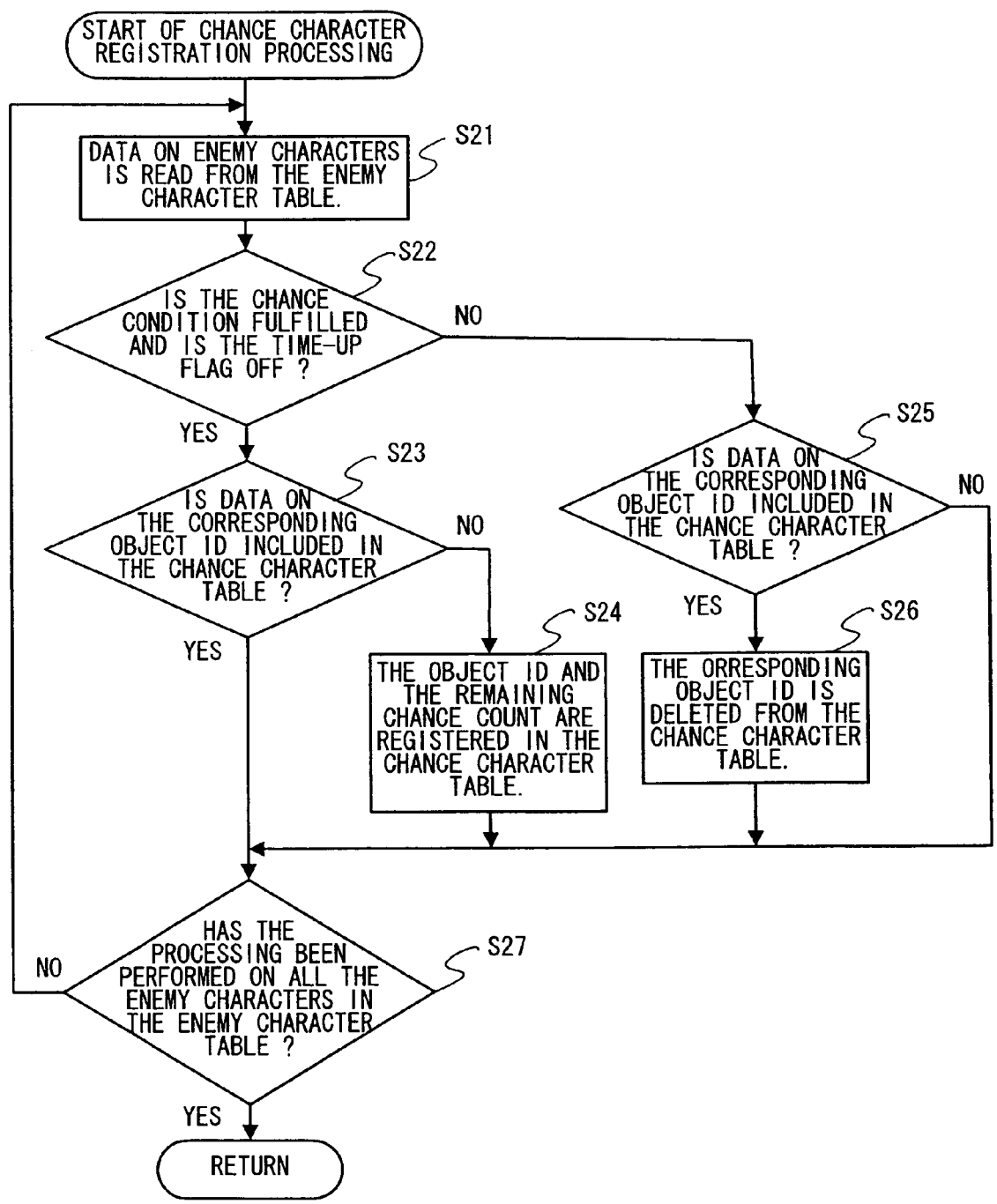
FIG. 16 is a flowchart of chance character registration processing.

FIG. 16 is a flowchart illustrating the chance character registration processing in step S2 in detail. Referring to FIG. 16, the CPU 22 reads data on enemy characters from the enemy character table 342 stored on the main memory 34 (step S21). Next, it is determined whether or not each read enemy character fulfills the corresponding chance condition (step S22). For example, when the value of the chance condition number of the enemy character of interest is 1, the condition of the condition number 1 is obtained from the chance condition table 344. The chance condition is "while the HP is 60 to 51". It is determined whether or not the current HP of the enemy character is in the range of 60 to 51. It is also determined whether or not the time-up flag is OFF. When the chance condition is fulfilled (YES in step S22), it is determined whether or not the object ID of the enemy character is registered in the chance character table 343 (step S23). Namely, it is determined whether or not the chance time against the enemy character is now to be newly activated. When the enemy character is already registered in the chance character table 343 (YES in step S23), the processing advances to step S27. When the enemy character is not registered yet (NO in step S23), the object ID and the chance duration count (as the initial value of the remaining chance count) of the enemy character are registered in the chance character table 343 (step S24).

When it is determined in step S22 that the chance condition regarding the enemy character is not fulfilled (NO in step S22), it is determined whether or not the object ID of the enemy character is registered in the chance character table 343 (step S25). This determination is made in order to allow the chance time to be deactivated if the chance time against the enemy character is already active and the chance condition is made unfulfilled because a regular attack was performed instead of a finishing attack. When it is determined in step S25 that the enemy character is not registered in the chance character table 343 (NO in step S25), the processing advances to step S27. When it is determined in step S25 that the enemy character is registered in the chance character table 343 (YES in step S25), the data on the enemy character is deleted from the chance character table 343 (step S26).

Then, the CPU 22 determines whether or not the above-described processing has been executed on all the enemy characters registered in the enemy character table 342 (step S27). When the processing has not been executed on all the enemy characters (NO in step S27), the processing returns to step S21 to repeat the above-described processing. When the processing has been executed on all the enemy characters (YES in step S27), the chance character registration processing is terminated.

Figure 17:
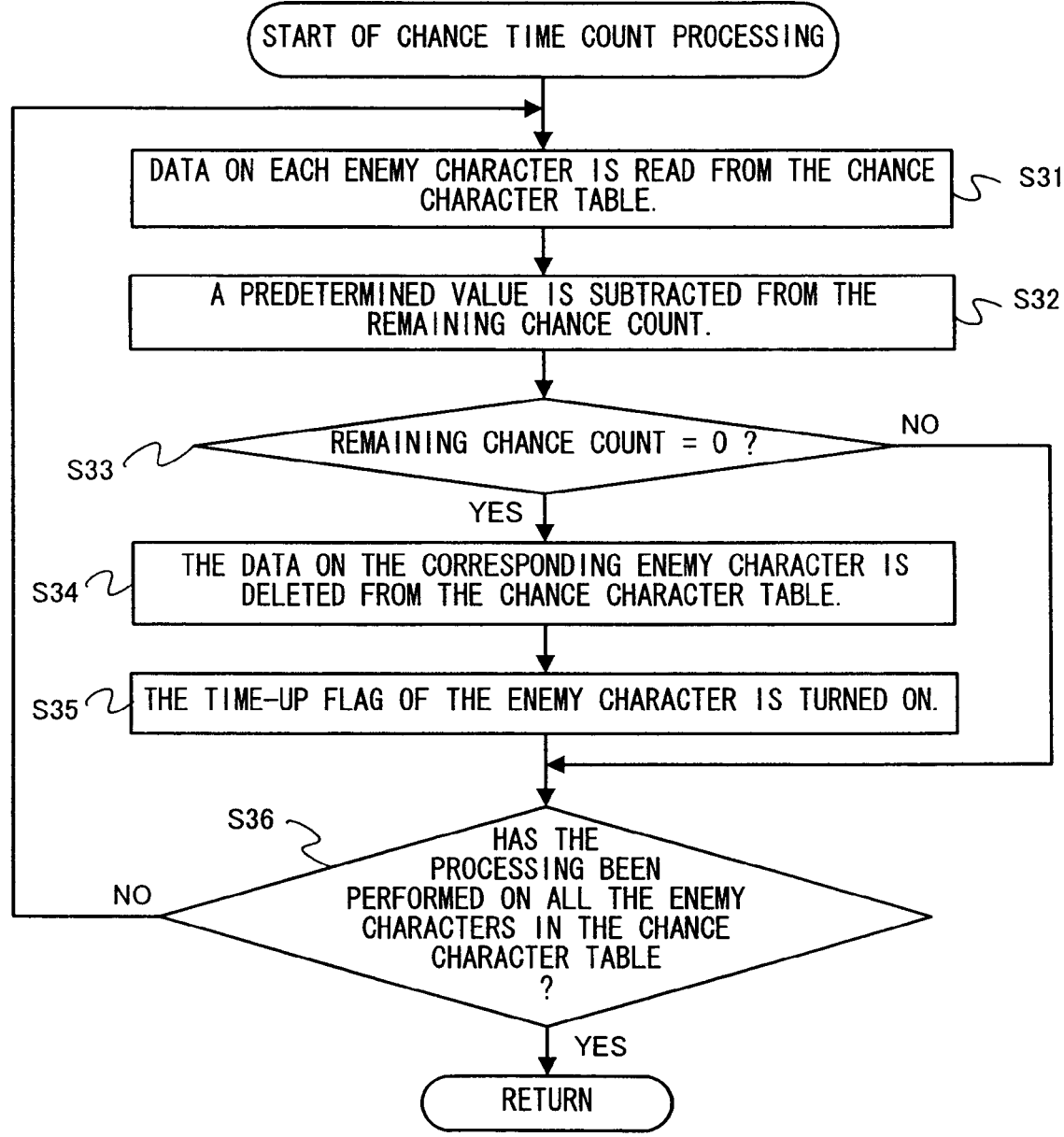
FIG. 17 is a flowchart of chance time count processing.

Returning to FIG. 15, after the processing in step S2 is finished, the CPU 22 executes chance count processing (step S3). In this processing, the chance time for each enemy character is counted. When a predetermined time duration passes, the chance time is deactivated. FIG. 17 is a flowchart illustrating the chance time count processing in step S3 in detail. Referring to FIG. 17, the CPU 22 reads data on each enemy character against which the chance time is active from the chance character table 343 (step S31). Next, a predetermined value (for example, "1") is subtracted from the remaining chance count of the read enemy character (step S32). It is determined whether or not the remaining chance count has been decreased to zero as a result of the subtraction, i.e., whether or not the chance time is up (step S33). When it is determined that the chance time is not up yet (NO in step S33), the value of the remaining chance count is updated into the post-subtraction value and stored in the chance character table 343, and the processing advances to step S36. When it is determined that the remaining chance count is zero (YES in step S33), the data on the enemy character is deleted from the chance character table 343 (step S34), and the time-up flag of the enemy character is turned ON in the enemy character table 342 (step S35). Then, the CPU 22 determines whether or not the above-described processing has been executed on all the enemy characters in the chance character table (step S36).

When it is determined that the processing has not been executed on all the enemy characters (NO in step S36), the processing returns to step S31 to repeat the above-described processing. When it is determined that the processing has been executed on all the enemy characters (YES in step S36), the chance time count processing is terminated.

Figure 18:
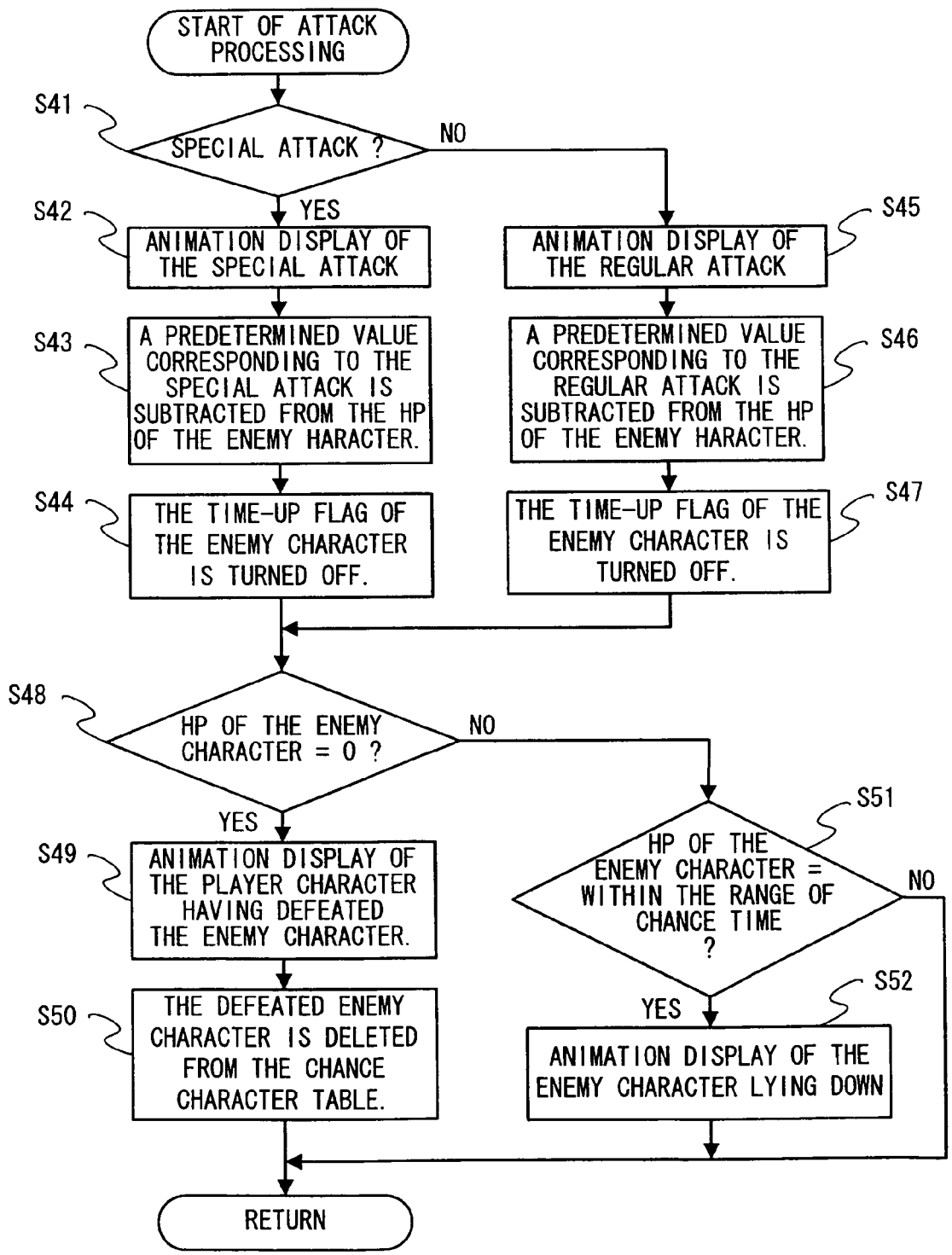
FIG. 18 is a flowchart of attack processing.

Returning to FIG. 15, after the processing in step S3 is finished, the CPU 22 determines whether or not the B button 20e (attack button) has been pressed (step S4). When it is determined that the B button 20e has been pressed (YES in step S4), the attack processing is executed in step S5. FIG. 18 is a flowchart illustrating the attack processing in step S5 in detail. Referring to FIG. 18, the CPU 22 determines whether or not a condition for performing an iaigiri attack as a special attack is fulfilled (step S41). More specifically, it is determined in step S41 whether or not the B button 20e has been pressed in the state where an enemy character is close to the player character and the player character keeps the sword in the sheath, which is the condition for performing an iaigiri attack. When it is determined that the condition is fulfilled (YES in step S41), an animation of the player character performing an iaigiri attack is displayed on the screen (step S42). Then, the current HP of the attacked enemy character is decreased by a predetermined value (40 in this example) (step S43). More precisely, before the HP is decreased, it is determined whether or not the iaigiri attack succeeded. However, since this is not directly relevant to the certain exemplary embodiments described herein, this processing will not be described and it is assumed that the iaigiri attack succeeded. After the HP is decreased, the CPU 22 turns OFF the time-up flag of the attacked enemy character (step S44), and advances the processing to step S48.

By contrast, when it is determined in step S41 that the condition for performing an iaigiri attack is not fulfilled (NO in step S41), a regular attack is performed. Namely, an animation of the player character performing a regular attack is displayed on the screen (step S45). Then, the current HP of the attacked enemy character is decreased by 10 (step S46). The CPU 22 turns OFF the time-up flag of the attacked enemy character (step S47), and advances the processing to step S48.

In step S48, it is determined whether or not the current HP of the attacked enemy character is zero (step S48). When it is determined that the current HP of the attacked enemy character is zero (YES in step S48), an animation of the player character having defeated the enemy character as shown in FIG. 8 is displayed on the screen (step S49), and the enemy character is deleted from the enemy character table 342. In the case where the enemy character is also registered in the chance character table 343, the enemy character is deleted from the chance character table 343 (step S50).

When it is determined in step S48 that the current HP of the attacked enemy character is not zero (NO in step S48), it is determined whether or not the current HP is in the range of the chance condition (step S51). When it is determined that the current HP is in the range of the chance condition (YES in step S51), an animation of the enemy character lying down as shown in FIG. 6 is displayed on the screen (step S52). When it is determined that the current HP is not in the range of the chance condition (NO in step S51), the attack processing is terminated. Thus, the attack processing in step S5 is finished.

Returning to FIG. 15, when it is determined in step S4 that the B button 20e (attack button) has not been pressed (NO in step S4), the CPU 22 determines whether or not any enemy character registered in the chance character table 343 is present within a predetermined distance from the player character in the game space (step S6). When it is determined that an enemy character is present within the predetermined distance from the player character (YES in step S6), the CPU 22 displays, at the right bottom corner of the screen, a message indicating that a finishing attack is executable as shown in FIG. 6 (step S7). Then, it is determined whether or not the A button 20b (finishing attack button) has been pressed (step S8). When it is determined that the A button 20b has not been pressed (NO in step S8), the processing advances to step S11. When it is determined that the A button 20b has been pressed (YES in step S8), finishing attack processing is executed (step S9).

Figure 19:
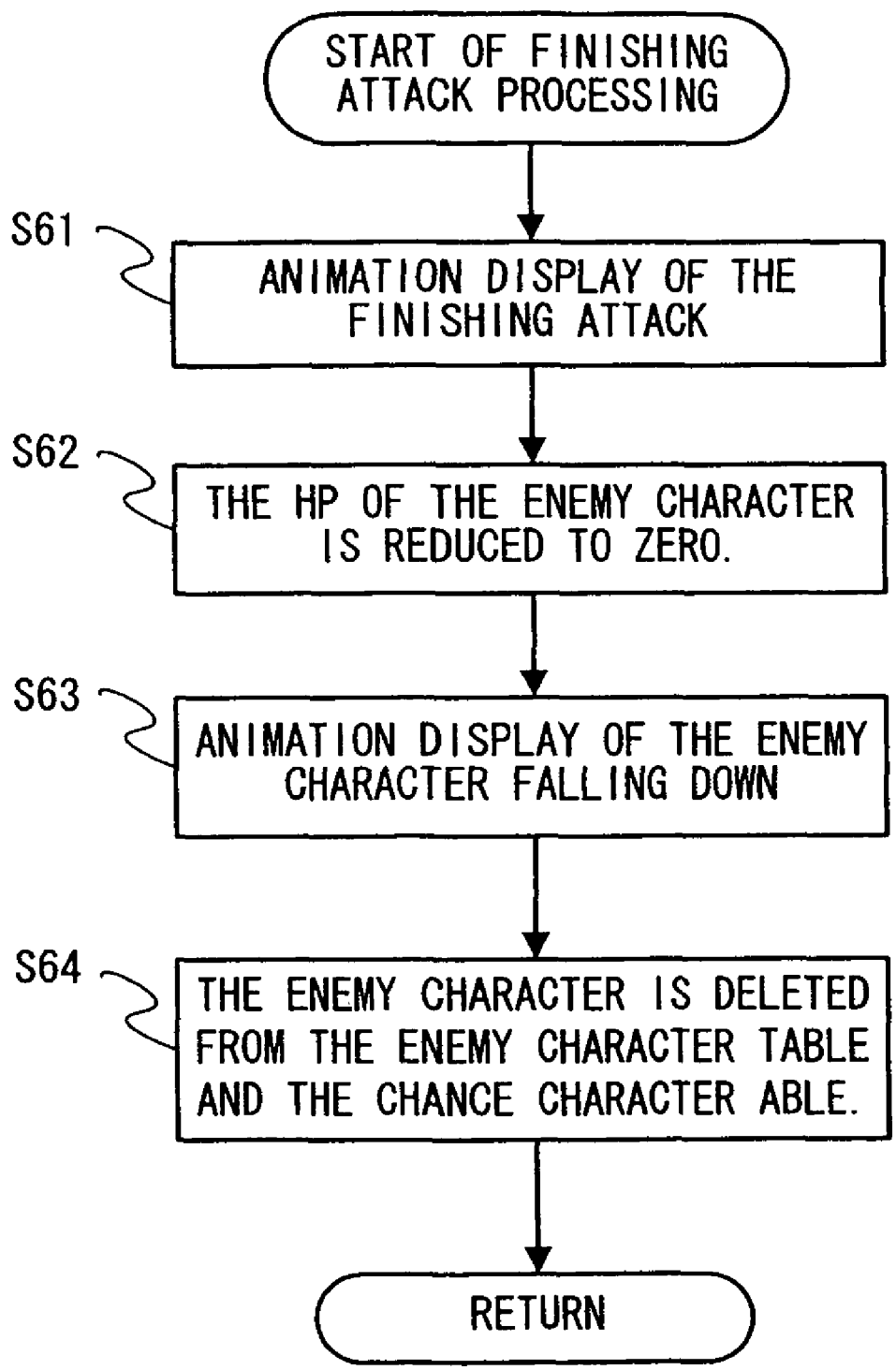
FIG. 19 is a flowchart of finishing attack processing.

FIG. 19 is a flowchart illustrating the finishing attack processing in step S9 in detail. Referring to FIG. 19, the CPU 22 displays an animation of the player character performing a finishing attack on the screen (step S61). Next, the current HP of the attacked enemy character is decreased to zero (step S62). Then, an animation of the enemy character falling down is displayed (step S63). The enemy character is deleted from the enemy character table 342 and the chance character table 343 (step S64). Thus, the finishing attack processing is finished.

Returning to FIG. 15, when it is determined in step S6 that no enemy character registered in the chance character table 343 is present within the predetermined distance from the player character (NO in step S6), the message indicating that the finishing attack is executable is erased (step S10). Namely, when the enemy character against which the finishing attack was executable becomes away from the player character by the predetermined distance or longer, the message indicating that the finishing attack is executable is erased.

In step S11, display processing corresponding to each state of the game is executed. More specifically, an image of the virtual space taken by a virtual camera is displayed on the TV 12 as a game image. After step S11, it is determined whether or not the game is to be over (step S12). When the game is to be over (YES in step S12), the game is terminated. When the game is not to be over (NO in step S12), the processing returns to step S2 to repeat the above-described processing. Thus, the game processing according to this exemplary embodiment is finished.

As described above, according to this exemplary embodiment, a certain range of HP values of each enemy character is set as a chance time, in which a finishing attack capable of defeating the enemy character with one blow regardless of the remaining HP value is executable. Thus, instead of a monotonous pattern of merely performing the same type of attack repeatedly to decrease the HP, the game provides the player with an alternative opportunity to defeat the enemy character with one blow regardless of the remaining HP value if only a predetermined condition is fulfilled. As a consequence, the range of available attacks or strategies can be broadened. If a finishing attack succeeds, the enemy is necessarily defeated with one blow. This gives the player a sense of achievement. The player can enjoy both a wider range of strategies including an attempt to successfully perform a finishing attack and a sense of achievement of defeating the enemy with one blow as intended. Thus, the player finds the game ever-stimulating. For activating a chance time, different chance conditions can be set for different enemy characters. The player can enjoy seeking an opportunity to defeat each enemy with one blow, which makes the game more complicated and more amusing. Since the chance time is active in a limited time duration, the player feels a moderate degree of tension because of the need to launch a finishing attack before the time is up, which makes the game more exciting.

Figure 20:
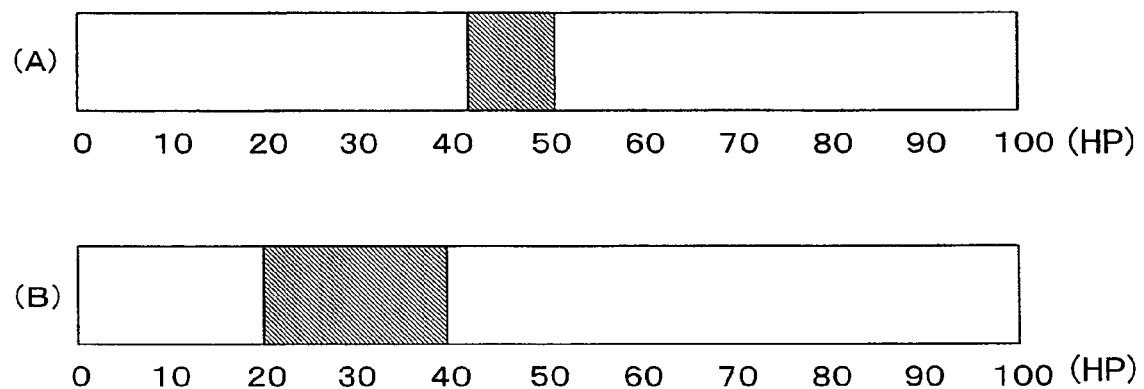
FIG. 20 shows exemplary chance conditions against enemy characters.

In the above-described exemplary embodiment, the chance condition is fulfilled by performing a regular attack a plurality of times. The certain exemplary embodiments are not limited to this, and the chance condition may be fulfilled by performing an iaigiri attack (special attack). For example, in the above exemplary embodiment, when the iaigiri attack succeeds, the current HP of the enemy character is simply decreased by 40 in step S43. In this case, depending on the range of the HP values set as the chance condition, the HP may be decreased by the iaigiri attack to a value out of the range. In order to avoid this, with the precondition that the current HP of the enemy character is greater than the range of the chance condition, it may be set such that if an iaigiri attack succeeds, the chance time against the enemy character is necessarily activated. This will be described more specifically with reference to FIG. 20. Part (A) indicates that the range of the chance condition against an enemy character is 50 to 41 with respect to the maximum HP value of 100. In such a case, a value which, if subtracted from the maximum HP value of 100, causes the current HP to be within the range of 50 to 41 (the chance condition) is calculated, and then such a value may be subtracted from 100. Part (B) indicates that the range of the chance condition against an enemy character is 40 to 21. Similarly, a value which, if subtracted from the maximum HP value of 100, causes the current HP to be within the range of 40 to 21 (the chance condition) is calculated, and then such a value may be subtracted from 100.

The above-mentioned processing may be adopted only when the first attack against an enemy character is an iaigiri attack. By such a setting, if an iaigiri attack as the first attack succeeds, the finishing attack can be made next (i.e., two successive attacks of the iaigiri attack→the finishing attack are executable). Specifically, the technique described above with reference to FIG. 20 is used when the current HP of the enemy character matches the maximum HP value before the subtraction in step S43. According to an alternative technique, the attack power of an iaigiri attack is fixed to 40, and the range of the chance condition regarding each enemy character is set such that the chance time is necessarily activated if the iaigiri attack succeeds once. Namely, regarding all the enemy characters, it may be set such that a value obtained by subtracting 40 from the maximum HP value of each enemy character is included in the range of the HP values for activating the chance time.

In the above-described exemplary embodiment, a chance time is active when the HP value is within a predetermined range. The certain exemplary embodiments are not limited to this, and parameters regarding the state of the enemy character other than the HP value may be used for the chance condition. For example, a chance time against an enemy character may be set to be activated only when the enemy character present in a cave in the above-described virtual game space is hit by the sunlight coming through the crack in the cave. In this case, for example, it may be determined that the chance condition is fulfilled when the coordinate set representing the position of the enemy character in the virtual game space overlaps the coordinate set representing the position on the ground irradiated with the sunlight. Alternatively, the chance condition may be determined to be fulfilled when the natural environment in the virtual game space containing the enemy character changes, for example, when it is raining or when an earthquake is occurring. In such a case, a parameter which represents a change in the natural environment in the virtual game space, i.e., a parameter which indicates that it is raining or an earthquake is occurring is set; and the chance condition is determined to be fulfilled using the parameter. By such a setting, the player can enjoy the game in various different ways in accordance with the development of the game or a change in the natural environment in the game. This also makes the game ever-exciting.

In the above-described exemplary embodiment, the enemy is determined to be defeated and incapable of fighting when the HP of the enemy character becomes zero as a result of a finishing attack being performed. The certain exemplary embodiments are not limited to this. According to another possible technique, the HP of the enemy character is not decreased even after the finishing attack. Instead, an animation of the enemy character falling down as a result of the finishing attack is displayed on the screen, and the enemy character is deleted from the chance character table 343 and the enemy character table 342. In this case, it is not necessary to execute the processing of subtracting the HP, which alleviates the processing load.

While the certain exemplary embodiments have been described in detail, the foregoing description is in all aspects illustrative and not restrictive. It is understood that numerous other modifications and variations can be devised without departing from the scope of these certain exemplary embodiments.

What is claimed is:

1. A non-transitory storage medium having stored thereon a game program executable by a computer of a game apparatus for displaying a player object performing an attack motion in response to an operation by a player and at least one enemy object associated with a body strength value which changes in accordance with a state in a virtual game world and for representing a fight between the objects in the virtual game world by which the body strength value of the enemy object is decreased in accordance with a degree of damage caused to the enemy object by the attack motion of the player object, the game program causing the computer to execute:
   receiving an input of an operation for attacking the enemy object;
   determining, after the input of the operation for attacking is received, whether or not the body strength value of the enemy object is within a predetermined range; and
   when it is determined that the body strength value of the enemy object is within the predetermined range, the predetermined range including the body strength value of the enemy object being greater then one, receiving an input operation for performing a finishing attack on the enemy object, wherein the enemy object is set to substantially the same state as where the body strength value of the enemy object is zero, even when the degree of damage caused by the finishing attack is less than the body strength value of the enemy object, and wherein the finishing attack only one hit to set the body strength value of the enemy object to substantially the same state as where the body strength value of the enemy object is zero.

2. A storage medium according to claim 1, wherein the body strength value of the enemy object is set to zero regardless of the degree of damage caused by the finishing attack only when it is determined that the body strength value of the enemy object is within the predetermined range.

3. A storage medium according to claim 1, wherein the game program further causes the computer to execute, when it is determined that the body strength value of the enemy object is not within the predetermined range, decreasing the body strength value of the enemy object in accordance with the degree of damage caused by the input operation for attacking the enemy object.

4. A storage medium according to claim 1, wherein the game program further causes the computer to execute:

receiving an input of an operation for performing a special attack against the enemy object; and when the input of the operation for performing the special attack is received, changing the body strength value of the enemy object such that the body strength value is included in the predetermined range.

5. A storage medium according to claim 1, wherein a range which is set for each of the at least one enemy object is used for the predetermined range of the body strength value used for determining whether or not the body strength value of the enemy object is within the predetermined range.

6. A storage medium according to claim 5, wherein at least two predetermined ranges are set for each of the at least one enemy object.

7. A storage medium according to claim 1, wherein the game program further causes the computer to execute setting a predetermined time duration in which the setting of the enemy object to substantially the same state as where the body strength value of the enemy object is zero regardless of the degree of damage caused by the finishing attack is permitted to be executed after it is determined that the body strength value of the enemy object is within the predetermined range.

8. A storage medium according to claim 7, wherein the at least one enemy object includes a plurality of enemy objects, and the time limit setting includes setting a different predetermined time duration for each of the plurality of enemy objects.

9. A storage medium according to claim 1, wherein the game program further causes the computer to execute, when it is determined that that the body strength value of the enemy object is within the predetermined range, displaying that the setting of the enemy object to substantially the same state as where the body strength value of the enemy object is zero regardless of the degree of damage caused by the finishing attack is executable on a screen of the game apparatus.

10. A game apparatus for displaying a player object performing an attack motion in response to an operation by a player and at least one enemy object associated with a body strength value which changes in accordance with a state in a virtual game world and for representing a fight between the objects in the virtual game world by which the body strength value of the enemy object is decreased in accordance with a degree of damage caused to the enemy object by the attack motion of the player object, the game apparatus comprising:
  a processor;
  a memory coupled to said processor, said memory storing instructions that, when executed by said processor, control said processor to:
  receive an input of an operation for attacking the enemy object;
  determine, after the input of the operation for attacking is received, whether or not the body strength value of the enemy object is within a predetermined range; and
  when it is determined that the body strength value of the enemy object is within the predetermined range, the predetermined range including the body strength value of the enemy object being greater then one, receiving an input operation for performing a finishing attack on the enemy object, wherein the enemy object is set to substantially the same state as where the body strength value of the enemy object is zero, even when the degree of damage caused by the finishing attack is less than the body strength value of the enemy object, wherein the finishing attack only one hit to set the body strength value of the enemy object to substantially the same state as where the body strength value of the enemy object is zero.

11. A game system including a plurality of game apparatuses for displaying a player object performing an attack motion in response to an operation by a player and at least one enemy object associated with a body strength value which changes in accordance with a state in a virtual game world and for representing a fight between the objects in the virtual game world by which the body strength value of the enemy object is decreased in accordance with a degree of damage caused to the enemy object by the attack motion of the player object, the system comprising:
  a processing system including one or more processors;
  a memory coupled to said processing system, said memory storing instructions that, when executed by said processing system, control said processing system to:
  receive an input of an operation for attacking the enemy object;
  determine, after the input of the operation for attacking is received, whether or not the body strength value of the enemy object is within a predetermined range; and
  when it is determined that the body strength value of the enemy object is within the predetermined range, the predetermined range including the body strength value of the enemy object being greater then one, receive an input operation for performing a finishing attack on the enemy object, wherein the enemy object is set to substantially the same state as where the body strength value of the enemy object is zero, even when the degree of damage caused by the finishing attack is less than the body strength value of the enemy object, wherein the finishing attack only one hit to set the body strength value of the enemy object to substantially the same state as where the body strength value of the enemy object is zero.

12. A method for displaying a player object on a display device performing an attack motion in response to an operation by a player and at least one enemy object associated with a body strength value which changes in accordance with a state in a virtual game world and for representing a fight between the objects in the virtual game world by which the body strength value of the enemy object is decreased in accordance with a degree of damage caused to the enemy object by the attack motion of the player object, the method comprising:
  via an input device receiving an input of an operation for attacking the enemy object;
  determining, after the input of the operation for attacking is received, whether or not the body strength value of the enemy object is within a predetermined range; and
  when it is determined that the body strength value of the enemy object is within the predetermined range, the predetermined range including the body strength value of the enemy object being greater then one, via the input device receiving an input operation for performing a finishing attack on the enemy object, wherein the enemy object is set to substantially the same state as where the body strength value of the enemy object is zero, even when the degree of damage caused by the finishing attack less than the body strength value of the enemy object, wherein the finishing attack only one hit to set the body strength value of the enemy object to substantially the same state as where the body strength value of the enemy object is zero.

* * * * *